US006103442A

United States Patent [19]

Katagiri et al.

[11] Patent Number: 6,103,442

[45] Date of Patent: Aug. 15, 2000

[54] METHOD AND APPARATUS FOR PRODUCING ELECTROPHOTOGRAPHIC PHOTOSENSITIVE MEMBER

[75] Inventors: Hiroyuki Katagiri; Yoshio Segi; Hideaki Matsuoka; Yasuyoshi Takai, all of Nara, Japan

[73] Assignee: Canon Kabushiki Kaisha, Tokyo, Japan

[21] Appl. No.: 09/218,633

[22] Filed: Dec. 22, 1998

[30] Foreign Application Priority Data

| | | | |
|---|---|---|---|
| Dec. 26, 1997 | [JP] | Japan | 9-361303 |
| Dec. 10, 1998 | [JP] | Japan | 10-351551 |

[51] Int. Cl.$^{7}$ .............................. G03G 5/10; B23B 45/08

[52] U.S. Cl. .............................................. 430/127; 408/61

[58] Field of Search .................................... 430/127, 128, 430/131; 408/61; 29/DIG. 88

[56] References Cited

U.S. PATENT DOCUMENTS

| | | | |
|---|---|---|---|
| 4,504,518 | 3/1985 | Ovshinsky et al. | 427/38 |
| 5,314,780 | 5/1994 | Takei et al. | 430/128 |
| 5,480,627 | 1/1996 | Takei et al. | 430/127 |
| 5,480,754 | 1/1996 | Takei et al. | 430/65 |

FOREIGN PATENT DOCUMENTS

| | | |
|---|---|---|
| 54-086341 | 7/1979 | Japan . |
| 59-193463 | 11/1984 | Japan . |
| 60-186849 | 9/1985 | Japan . |
| 60-262936 | 12/1985 | Japan . |
| 61-231561 | 10/1986 | Japan . |
| 61-283116 | 12/1986 | Japan . |
| 62-095545 | 5/1987 | Japan . |
| 63-311261 | 12/1988 | Japan . |
| 1-156758 | 6/1989 | Japan . |
| 3-205824 | 9/1991 | Japan . |
| 6-273955 | 9/1994 | Japan . |
| 7-034123 | 4/1995 | Japan . |
| 8-44090 | 2/1996 | Japan . |

*Primary Examiner*—John Goodrow
*Attorney, Agent, or Firm*—Fitzpatrick, Cella, Harper & Scinto

[57] ABSTRACT

The present invention provides a method of producing an electrophotographic photosensitive member capable of obtaining high-quality uniform images without image defects and nonuniformity in image density. The method of producing an electrophotographic photosensitive member includes a step forming a functional film on a substrate, and a washing step of spraying water on the substrate surface from concentrically arranged nozzle groups positioned in a twisted relationship before the step of forming the functional film.

22 Claims, 8 Drawing Sheets

METHOD AND APPARATUS FOR PRODUCING ELECTROPHOTOGRAPHIC PHOTOSENSITIVE MEMBER

BACKGROUND OF THE INVENTION

1. Field of the Invention

The present invention relates to a method of producing an electrophotographic photosensitive member comprising a functional film.

2. Description of the Related Art

As a substrate for forming a deposited film of an electrophotographic photosensitive member, glass, heat-resistant synthetic resins, stainless steel, aluminum, and the like have been proposed. However, in order to perform an electrophotographic process comprising charging, exposure, development, transfer, and cleaning, and to keep positional precision at a constant, high level to maintain high image quality, a metal is frequently used for practical applications. Particularly, aluminum has good workability, is inexpensive and lightweight, and is thus an optimum material as a substrate for the electrophotographic photosensitive member.

Techniques for forming substrate materials for the electrophotographic photosensitive member are disclosed in Japanese Patent Laid-Open Nos. 59-193463 and 60-262936.

Japanese Patent Laid-Open No. 59-193463 discloses a technique in which a supporting member comprises an aluminum alloy containing 2000 ppm or less of iron (Fe) to obtain an electrophotographic photosensitive member comprising amorphous silicon which is capable of forming images with good quality. This publication also discloses a procedure comprising cutting a cylindrical substrate by a lathe to a mirror surface, and then forming amorphous silicon by glow discharge.

Japanese Patent Laid-Open No. 60-262936 discloses an extruded aluminum alloy having the excellent property of vapor deposited amorphous silicon and comprising 3.0 to 6.0 at % magnesium (Mg), impurities composed of manganese (Mn) suppressed to 0.3 wt % or less, chromium (Cr) suppressed to less than 0.01 wt %, Fe suppressed to 0.15 wt % or less, and silicon suppressed to less than 0.12 wt %, and the balance comprising Al.

The substrates comprising these materials are subjected to surface processing to form a light receiving layer on the surfaces thereof according to application of the electrophotographic photosensitive member. Techniques for surface processing these substrates are disclosed in Japanese Patent Laid-Open Nos. 61-231561 and 62-95545. As a technique for preventing corrosion in a water washing step when an aluminum alloy is used as the substrate, Japanese Patent Laid-Open No. 6-273955 discloses a technique in which a substrate is washed with water containing dissolved carbon dioxide. However, this publication does not disclose that the film thickness and the composition ratio are defined in predetermined ranges by using water containing a specified inhibitor.

Japanese Patent Laid-Open Nos. 63-311261 and 1-156758 and Japanese Patent Publication No. 7-34123 disclose techniques for forming an oxide film on an Al substrate, but do not disclose that a film is formed after washing with water containing an inhibitor containing specified components.

Japanese Patent Laid-Open No. 3-205824 discloses the technique of washing by injecting high pressure, but discloses neither washing by using a ring comprising nozzles set to specified conditions, nor washing with water containing a specified inhibitor. Japanese Patent Laid-Open No. 8-44090 discloses that an electrophotographic photosensitive member is formed by using a substrate subjected to surface treatment with a silicate solution, but discloses neither washing by using a ring comprising nozzles set to specified conditions, nor washing with water containing a specified inhibitor.

As materials used for the electrophotographic photosensitive member, various materials have been proposed, which include selenium, cadmium sulfide, zinc oxide, amorphous silicon, organic materials such as phthalocyanine, and the like. Particularly, a non-single crystal deposited film containing a silicon atom as a main component represented by an amorphous silicon film, for example, an amorphous deposited film composed of amorphous silicon which is compensated by hydrogen and/or halogen (e.g., fluorine, chlorine, or the like), has been proposed for a pollution-free photosensitive member having high performance and high durability; some of such materials have been put into practical use. Japanese Patent Laid-Open No. 54-86341 discloses a technique for an electrophotographic photosensitive member comprising a photoconductive layer mainly made of amorphous silicon.

Conventional methods of forming such a non-single crystal deposited film containing a silicon atom as a main component include a sputtering method, a method (thermal CVD method) of thermally decomposing raw material gases, a method (optical CVD method) of optically decomposing raw material gases, a method (plasma CVD method) of decomposing raw material gases by a plasma, and the like.

The plasma CVD method, i.e., the method of decomposing raw material gases by radio frequency or microwave glow discharge to form a deposited thin film on a substrate, is optimum as the method of forming an electrophotographic amorphous silicon deposited film, and practical use thereof is in progress at present. Particularly, the plasma CVD method comprising decomposition by microwave glow discharge, i.e., the microwave plasma CVD method, has recently attracted attention as the method of forming a deposited film in the industrial field.

The microwave plasma CVD method has the advantages that go the deposition rate and efficiency of utilization of raw material gases are higher than the other methods. U.S. Pat. No. 4,504,518 discloses an example of microwave plasma CVD techniques taking advantage of this method. The technique disclosed in this U.S. patent comprises forming a deposited film having high quality at a high deposition rate by the microwave plasma CVD method under low pressure of 0.1 Torr or less.

Furthermore, Japanese Patent Laid-Open No. 60-186849 discloses a technique for improving the efficiency of utilization of raw material gases in the microwave plasma CVD method. The technique disclosed in this publication comprises arranging a substrate so as to surround a means for introducing microwave energy to form an inner chamber (i.e., a discharge space), thereby significantly improving the efficiency of utilization of raw material gases.

Japanese Patent Laid-Open No. 61-283116 discloses a modified microwave technique for producing a semiconductor member. Namely, this publication discloses a technique in which an electrode (a bias electrode) for controlling plasma potential is provided in a discharge space so that in film deposition, a desired voltage (a bias voltage) is applied to the bias electrode to control ion attack on the deposited film, thereby improving the characteristics of the deposited film.

Specifically, when an aluminum alloy cylinder is used as the substrate, the method of producing an electrophotographic photosensitive member by the above-described techniques is carried out as follows.

The aluminum alloy cylinder is processed to flatness in the predetermined range by diamond tool cutting using a lathe, a milling lathe, or the like according to demand, and then washed with triethane. After triethane washing, a deposited film mainly composed of amorphous silicon is formed as a deposited film of the photoconductive member on the substrate by a glow discharge decomposition method. The thus-obtained deposited film is used for producing the electrophotographic photosensitive member.

However, the electrophotographic photosensitive member produced by the above techniques has an abnormal growth portion in the deposited film, which creates a small area in which a surface charge is difficult to load. This phenomenon significantly occurs, particularly, in the case of an electrophotographic photosensitive member comprising a deposited film such as an amorphous silicon film, which is formed by the plasma CVD method. However, the area where surface potential is barely loaded can be minimized by optimizing surface processing conditions, washing conditions, and deposition conditions for the substrate. Such an area is conventionally in a level equivalent to or lower than the development resolution, and thus causes no practical problem in the electrophotographic photosensitive member.

However, recently, 1) as the development resolution has been improved with demand for improving the quality of the image formed by the electrophotographic photosensitive member, and 2) as charging conditions have been made more severe with increases in the process speed of a copying machine, it has been pointed out that the area where surface potential is barely loaded greatly affects the potential of the peripheral region thereof, resulting in an image defect.

Furthermore, since a conventional electrophotographic apparatus is mainly used for copying characters, and thus mainly used for a character original (i.e., line copy), an image defect causes no great problem in practical use. However, as the quality of the image copied by a copying machine has recently increased, a halftone original such as a photograph has frequently been copied. Therefore, there is now demand for an electrophotographic photosensitive member having less abnormal growth portions. Particularly, in a color copying machine which has recently been popularized, such an abnormal growth portion visually appears, and thus an electrophotographic photosensitive member having less abnormal growth portions is required.

Since the abnormal growth portion is small, it is difficult to detect the presence of the portion even by measuring conductivity using an electrode attached to the upper portion of the deposited film. However, when the electrophotographic photosensitive member is used in an electrophotographic process comprising charging, exposure, and development, particularly when a uniform halftone image is formed, a small potential difference on the surface of the electrophotographic photosensitive member significantly visually appears as an image defect. Particularly, in an electrophotographic photosensitive member produced by using the microwave plasma CVD method, the above-mentioned problem significantly occurs.

On the other hand, such an image defect occurs, particularly, in an electrophotographic photosensitive member produced by using the plasma CVD method, as compared with an Se electrophotographic photosensitive member produced by using vacuum deposition, and an OPC (Organic Photoconductor) electrophotographic photosensitive member produced by using a blade coating method or a dipping method.

Of devices produced by using the plasma CVD method, the above problem does not occur in a device such as a solar cell or the like, in which its performance is not affected by a small change in characteristics with the position on the substrate, and which can be modified by post processing.

Although, in conventional techniques, the substrate is washed with trichloroethane with no problem, such a chlorinated solvent should not be used due to recent environmental problems, and water washing is done instead. However, water washing of aluminum cannot be completely performed only by spraying a high-pressure washing solution, thus causing a problem in that a portion containing many impurities (Si and the like), which are partially exposed from an aluminum surface forms a local battery with a peripheral aluminum portion to accelerate corrosion of the substrate surface.

SUMMARY OF THE INVENTION

Accordingly, it is an object of the present invention to provide a production method which can prevent corrosion in processing of a substrate, and staining and nonuniformity in washing, and which can stably produce an electrophotographic photosensitive member having less abnormal growth portions and high performance in high yield, at low cost and at a high rate.

Another object of the present invention is to solve the problem of significantly producing an image defect in the plasma CVD method, and provide a method of producing an electrophotographic photosensitive member capable of obtaining uniform high-quality images.

In order to achieve these objects, the present invention provides a method of producing an electrophotographic photosensitive member comprising the steps of forming a functional film comprising an amorphous material composed of a silicon atom as a major material on the surface of an aluminum substrate by a vacuum vapor phase growth method, and the step of spraying water on the substrate surface from a first nozzle group and a second nozzle group before the functional film is formed on the surface, wherein each of the first and second nozzle groups comprises at least two nozzles arranged at equal intervals on a concentric circle, and both nozzle groups have a twisted positional relationship, for spraying water on the substrate surface.

The present invention also provides an apparatus for producing an electrophotographic photosensitive member comprising a plurality of nozzles for spraying water on the surface of a substrate, wherein the nozzles for spraying water on the surface of the substrate comprises a first nozzle group and a second nozzle group each of which comprises at least two nozzles arranged at equal intervals on the same circle, and which have a twisted positional relationship.

Further objects, features and advantages of the present invention will become apparent from the following description of the preferred embodiments with reference to the attached drawings.

DESCRIPTION OF THE PREFERRED EMBODIMENT

Figure 1:
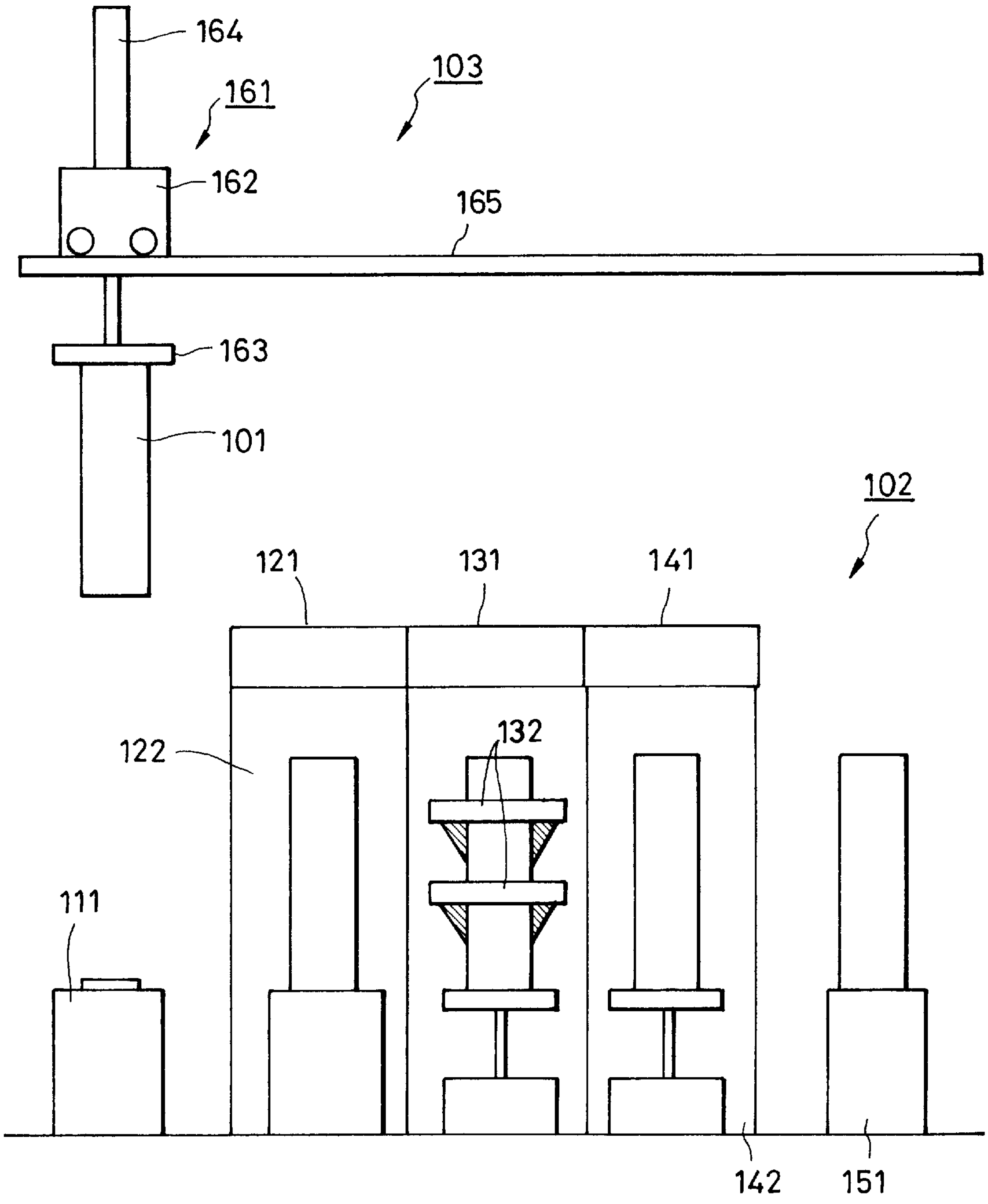
FIG. 1 is a schematic drawing showing an example of a washing apparatus used for carrying out a method of producing an electrophotographic photosensitive member of the present invention.

A possible cause of nonuniformity in image density, which occurs when an aluminum substrate is used for an electrophotographic photosensitive member, is nonuniformity in washing.

Causes of image defects which occur in the use of an aluminum substrate are roughly classified into the following groups:

(A) Dust particles which adhere to the substrate, and contaminants of washing water used in the washing and drying step become nuclei; and (B) Surface defects of the substrate become nuclei.

Adhesion of dust particles or the like described above in (A) can be prevented to some extent by cleaning a cutting or washing place where the substrate is handled, or completely cleaning the inside of a film deposition chamber and washing the substrate surface immediately before the deposited film is formed. This is conventionally achieved by washing with a chlorinated solvent such as trichloroethane or the like. Since the use of such a chlorinated solvent has recently been restricted because of destruction of the ozone layer, it is necessary to investigate a water washing method as a substitute.

On the other hand, as a method of decreasing the surface defects described above in (B), it is necessary to investigate a specified method of washing the aluminum substrate with aluminum containing specified components.

It was also made apparent that in pre-processing, before the step of forming the deposited film, a high-hardness portion of the aluminum substrate is scooped out by the blade of a processing machine for surface processing, such as cutting or the like, to cause the surface defects (B) on the aluminum substrate.

The present invention uses silicon-containing aluminum in order to prevent the above phenomenon. The reason for this is that occurrence of an oxide can be suppressed by including Si atoms in aluminum. Although aluminum preferably contains as small amounts of impurities as possible, melt processing of high-purity aluminum to the shape of the substrate easily causes the occurrence of an oxide, thereby producing many abnormal growth portions.

The present invention also uses an aqueous washing agent in which a corrosion inhibitor such as a silicate or the like is dissolved. The reason for this is that since aluminum containing silicon (Si) is corroded mainly in a portion locally containing much Si atoms, corrosion is prevented by the inhibitor. Although portions locally containing many Fe atoms or Cu atoms other than Si atoms is sometimes corroded in the same manner, corrosion can effectively be prevented by using the inhibitor, such as a silicate or the like.

When washing water is high temperature, or when aluminum contains Si, Fe and Cu atoms as well as magnesium for improving cutting performance, there is significant corrosion. In order to prevent corrosion of the aluminum substrate containing Si, Fe and Cu, the corrosion inhibitor is preferably added to an aqueous washing agent.

As a result of intensive research, with attention to whether the above defects can be suppressed by uniformly washing the substrate surface, and by adding a corrosion inhibitor to uniformly form a film over the entire surface of the substrate without influencing the functional film subsequently formed thereon in the substrate processing step before the functional film is formed on the substrate, the inventors achieved the prevent invention.

It is thought that an exposed portion of the aluminum surface, which contains many Si, Fe and Cu atoms, contacts the peripheral portion of the aluminum surface to form a local electrode with the normal aluminum portion, thereby accelerating corrosion.

On the other hand, high-pressure nozzles are provided around the substrate to permit uniform washing of the substrate in the circumferential direction thereof. In addition, adjacent nozzle groups are arranged to have a twisted positional relationship between them so that interference between water sprayed from the respective nozzles is prevented, thereby permitting uniform washing of the substrate surface. The addition of the inhibitor can protect the substrate surface from corrosion. By forming an Al—Si—O film on the aluminum surface, defects on the substrate surface can be removed, thereby preventing the occurrence of abnormal growth in the formation of the functional film.

By washing aluminum with an aqueous washing agent containing a silicate, not only is the occurrence of abnormal growth prevented, but also electrophotographic characteristics are improved.

In an embodiment of the present invention, an amorphous silicon deposited film is formed on the substrate by the plasma CVD method. In this step, the reaction can be divided into three steps including: 1) the step of decomposing raw material gases in a vapor phase; 2) the step of transferring active species from the discharge space to the substrate surface; 3) and the step of effecting surface reaction on the substrate surface. Of these steps, the surface reaction step plays an important role in determining the structure of the resulting deposited film. The surface reaction is greatly affected by the temperature, the material, the shape, and the absorbates of the substrate surface.

Particularly in a high purity aluminum substrate, water is nonuniformly adsorbed on the substrate surface. Therefore, in forming an amorphous silicon deposited film containing silicon, or a deposited film containing hydrogen or fluorine on the high-purity aluminum substrate by, for example, the plasma CVD method, the deposited film contacts water to produce the surface reaction, thereby changing the composition and structure of the deposited film at the interface between the substrate and the deposited film. As a result, in the electrophotographic process, the charge injected from the substrate is changed, and a difference in surface potential occurs. In the present invention, corrosion can be prevented by using an aluminum substrate containing an element having an anticorrosive effect.

In the present invention, before the step of forming the functional film by the plasma CVD method, the substrate surface can be washed by spraying water under high pressure through shower nozzles to decrease nonuniformity in washing. Also, the formation of an Al—Si—O film on the substrate surface by using a silicate as the inhibitor permits the formation of a good deposited film having an interface having the high charge transfer ability in the step of forming the deposited film. In the resulting substrate, therefore, chargeability is improved, and thus electrophotographic characteristics such as photosensitivity and the like are improved.

In the present invention, before the step of forming the deposited film on the cut substrate, the surface of the substrate is processed by degreasing and washing the substrate surface, rinsing the substrate surface, and drying the substrate surface in this order. In the degreasing and washing step, an aqueous washing agent containing a surfactant is used for removing residues on the substrate, such as oil and fat, halides, and the like, and a silicate is added to form a film having the anticorrosive effect on the surface of the aluminum substrate. This method can result in an aluminum substrate having a high-quality amorphous deposited film, unlike conventional methods.

Figure 3:
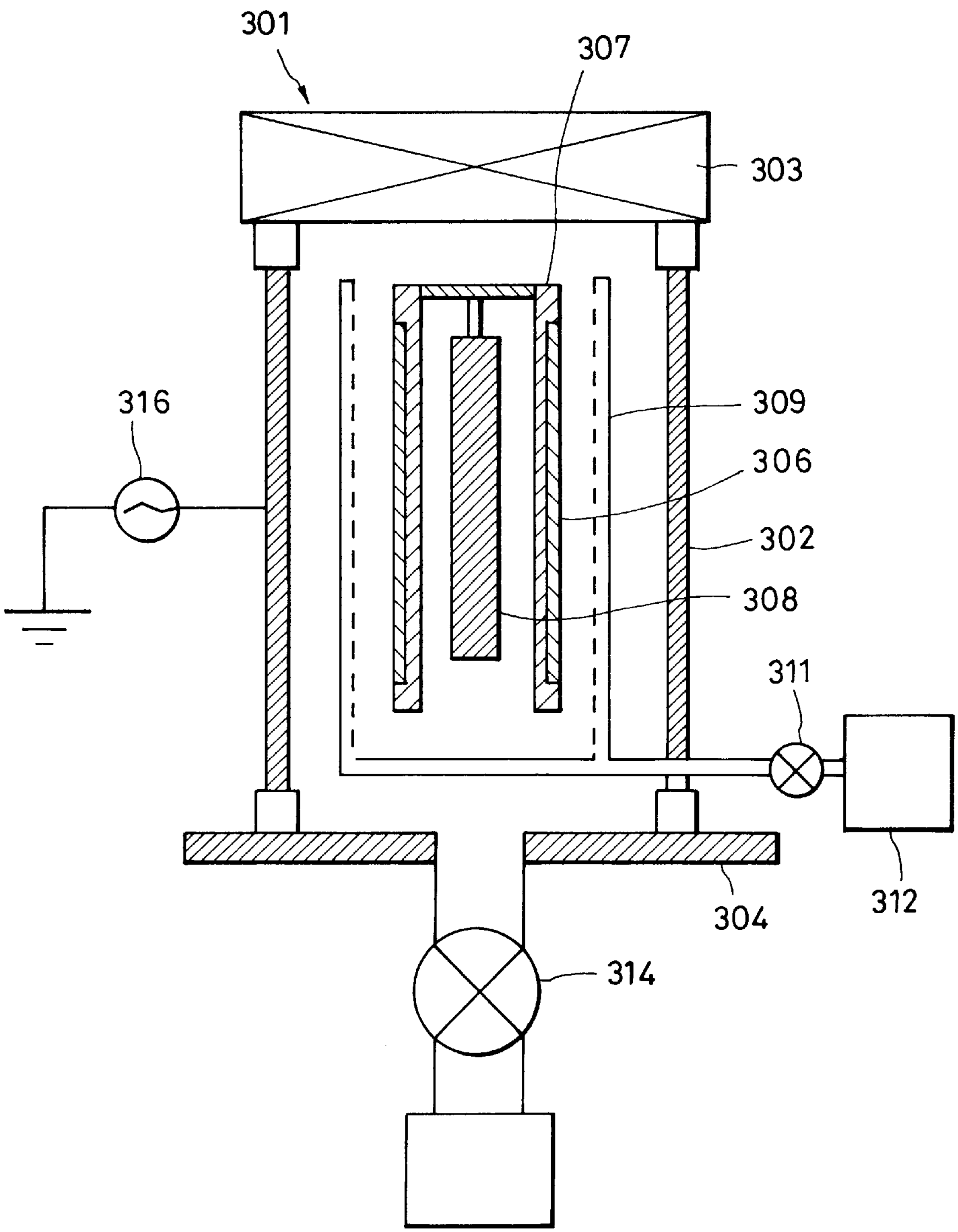
FIG. 3 is a schematic longitudinal sectional view of a deposited film forming apparatus for forming a deposited film on a cylindrical substrate by a RF plasma CVD method.

An example of the procedure for actually forming the electrophotographic photosensitive member (the substrate) by the method of producing an electrophotographic photosensitive member of the present invention using an aluminum alloy cylinder as the substrate will be described below with reference to FIG. 1 showing a washing apparatus of the present invention and FIG. 3 showing a deposited film forming apparatus.

The substrate carried to the washing step is a substrate cut to a mirror surface.

A diamond tool (trade name: Miracle Bit produced by Tokyo Diamond) is set in a lathe with an air damper for precise cutting to obtain a rake angle of 5° with respect to the central angle of the cylinder. Next, the substrate is chucked by the rotating flange of the lathe under a vacuum and then cut to a mirror surface having an outer diameter of 108 mm under conditions including a peripheral speed of 1000 m/min and a feed speed of 0.01 mm/R, with the illuminating kerosene sprayed from the annexed nozzles and the cutting dust drawn by the annexed vacuum nozzles.

After cutting, the substrate is carried to the washing apparatus. FIG. 1 shows the washing apparatus for washing the substrate surface.

The washing apparatus comprises a processing unit 102 and a substrate transfer mechanism 103. The processing unit 102 comprises a substrate base 111, a substrate washing bath 121, a high-pressure shower rinse bath 131, a drying bath 141, and a substrate carrying-out base 151. Each of the substrate washing bath 121 and the drying bath 141 is provided with a temperature controller (not shown) for keeping the solution temperature constant. The transfer mechanism 103 comprises a transfer rail 165 and a transfer arm 161, the transfer arm 161 comprising a movement mechanism 162 which moves on the rail 165, a chucking mechanism 163 for holding a substrate 101, and an air cylinder 164 for moving upward and downward the chucking mechanism 163.

The substrate 101 placed on the setting base 111 is transferred to the washing bath 121 by the transfer mechanism 103. A water washing region containing a surfactant in the washing bath 121 contains an aqueous washing agent 122 containing a surfactant to which a silicate is added, for ultrasonic washing of the substrate 101 to remove dust particles, and oil and fat, and the like, which adhere to the surface.

Figure 7:
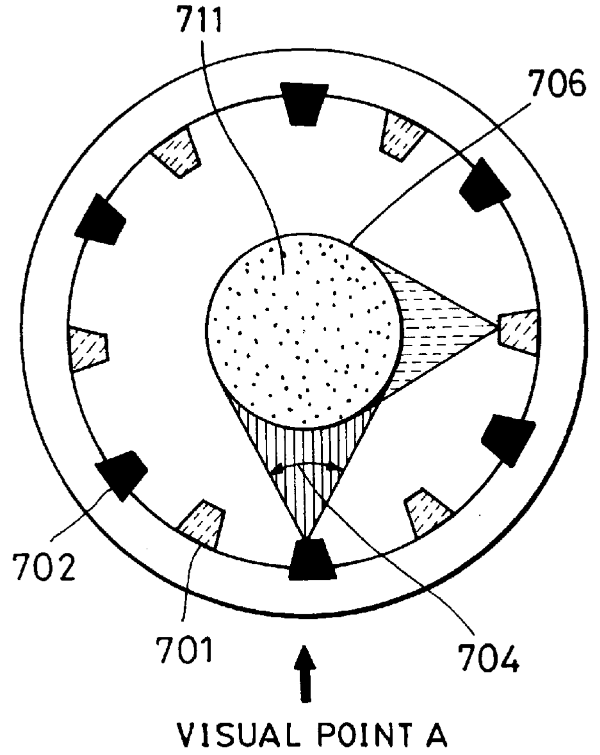
FIG. 7 is a schematic drawing showing the shape of a shower nozzle of the present invention.
Figure 7:
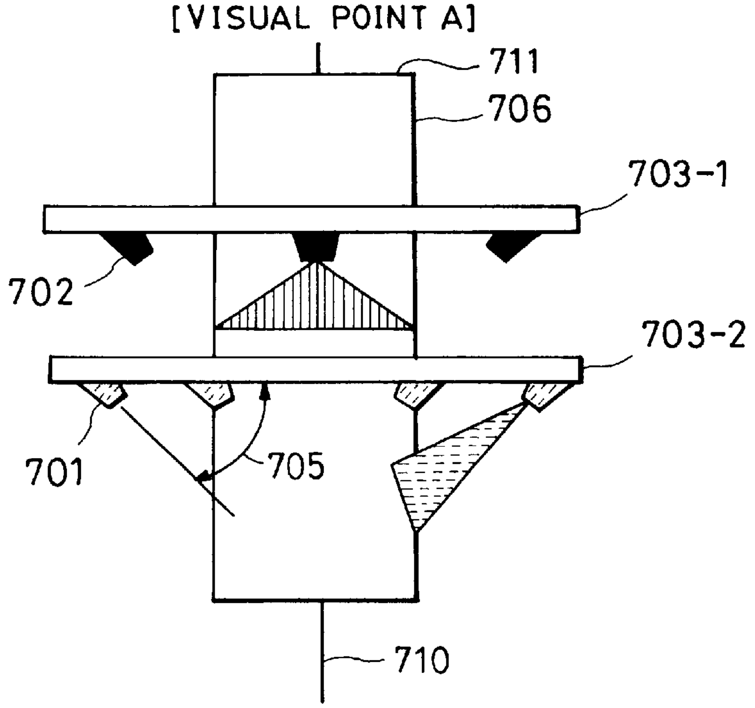

The substrate 101 is next moved, by the transfer mechanism 103, to the high-pressure shower rinse bath 131 in which water is sprayed from shower nozzles 132. The shower nozzles 132 which are positioned along a circumference of substrate to be washed are approximately shown in FIG. 7. As shown in FIG. 7, at least two shower nozzles are arranged at equal intervals on a circle to form a shower nozzle group. In FIG. 7, a shower ring 703-2 is under a shower ring 703-1. The present invention comprises a plurality of shower nozzle groups. Nozzles 702 which form a shower nozzle group, and nozzles 701 which form another shower nozzle group are in a twisted positional relationship. In other words, the nozzles 701 are differently positioned from the nozzles 702 in an axial direction 710 with respect to a circle face 711 of a cylindrical substrate 706. The nozzles 702 and 701 are provided on concentric shower rings 703-1 and 703-2, respectively, to have a variable spray angle 704 and a variable set angle 705, so that the substrate is washed to remove dust particles, etc. The shower ring 703-1 positions the nozzles 702 in plane, and so does the shower ring 703-2.

After the rinsing step, the substrate 101 is led to the drying step. The substrate 101 is moved, by the transfer mechanism 103, to the drying bath 141 in which the substrate is pulled up by a lifting device (not shown) in hot pure water or the like kept at a temperature of 60° C. The purity of the hot pure water is controlled to a constant by an industrial conductivity meter (trade name: α900R/C, produced by HORIBA, LTD.). After the drying step, the substrate 101 is transferred to the carrying-out base 151 by the transfer mechanism 103, and transferred from the washing apparatus shown in FIG. 1. Next, a deposited film mainly composed of amorphous silicon is formed on the substrate by the plasma CVD method using the apparatus for forming a deposited film of a photoconductive member shown in FIG. 3.

Referring to FIG. 3, a reactor 301 comprises a base plate 304, a wall 302, which also serves as a cathode electrode, and a top plate 303. In this reactor 301, a substrate 306 on which an amorphous silicon deposited film is formed is set at the center of the cathode electrode 302 to also serve as an anode electrode.

In order to form the amorphous silicon deposited film on the substrate 306 by using the deposited film forming apparatus, a raw material gas inflow valve 311 is first closed, and an exhaust valve 314 is opened to evacuate the reactor 301. When a vacuum gauge (not shown) reads about $5\times10^{-6}$ torr, the raw material gas inflow valve 311 is opened. The gas flow rate is controlled to a predetermined flow rate in a mass flow controller 312. For example, a raw material gas such as $SiH_4$ gas or the like is flowed into the reactor 301 through a raw material gas inlet tube 309. After it is confirmed that the surface temperature of the substrate 306 is set to the predetermined temperature by a heater 308, a radio-frequency power source (frequency: 13.56 MHz) 316 is set to desired power to generate glow discharge in the reactor 301.

During the formation of the deposited film, the substrate 306 is rotated at a constant speed by a motor (not shown) in order to attain uniform formation of the deposited film. In this way, the amorphous silicon deposited film is formed on the substrate 306.

In the present invention, the substrate may be a substrate having a surface processed to a flat mirror surface or a non-mirror surface for preventing interference fringes or the like, or a substrate provided with irregularities having a desired shape. Since corrosion is accelerated in a portion partially exposed from the aluminum surface and containing many Si, Fe and Cu atoms, a silicate is added to water used in at least one of the degreasing and washing steps, the rinsing step and the drying step before the film is formed. In addition, the film is more preferably formed before the substrate contacts pure water. The film of the present invention is formed in the relatively earlier stage, and thus pure water can be used in the rinsing step or the drying step after the film is formed on the substrate. Examples of the method of adding a silicate include a method of containing a silicate only in an aqueous washing agent containing a surfactant in the substrate washing bath for degreasing and washing after cutting, a method of using a silicate only in the rinsing step without using it in the degreasing and washing step, a method of using a silicate in the rinsing step and the drying step without using in the degreasing and washing step, and a method of using a silicate in all steps. All methods are suitable for the present invention.

As the inhibitor of the present invention, a phosphate, a silicate, a borate, and the like can be used; a silicate is particularly preferable for the present invention. Examples of silicates which can be used include potassium silicate, sodium silicate, and the like; potassium silicate is particularly preferred for the present invention.

Examples of surfactants which can be used in the present invention include anionic surfactants, cationic surfactants, nonionic surfactants, amphoteric surfactants, mixtures thereof, and the like. Particularly, anionic surfactants such as carboxylates, sulfonates, sulfates, phosphates, and the like; or nonionic surfactants such as aliphatic acid esters and the like are particularly preferred for the present invention.

The water used in at least one step of the degreasing and washing step, the rinsing step, and the drying step is semiconductor-grade pure water, preferably super-LSI-grade super pure water. Specifically, the lower limit of resistivity at a water temperature of 25° C. is 1 ΩM·cm or more, preferably 3 ΩM·cm or more, more preferably 5 ΩM·cm or more. The upper limit may be any value up to the theoretical resistance value (18.25 ΩM·cm), but from the viewpoint of cost and production, it is 17 ΩM·cm or less, preferably 15 ΩM·cm or less, more preferably 13 ΩM·cm or less. As the amount of fine particles, the amount of particles of 0.2 μm or more is 10000 or less per milliliter, preferably 1000 or less pre milliliter, more preferably 100 or less per milliliter. As the amount of microorganisms, the total number of viable cells is 100 or less per milliliter, preferably 10 or less per milliliter, more preferably 1 or less per milliliter. The total organic carbon (TOC) is 10 mg or less per milliliter, preferably 1 mg or less per milliliter, more preferably 0.2 mg or less per milliliter.

As the method of obtaining water having the above quality, an activated carbon method, a distillation method, an ion exchange method, a filtration method, a reverse osmosis method, an ultraviolet sterilization method, or the like can be used; a combination of at least two of these methods is preferably used for increasing water quality to the required level.

When the temperature of the aqueous washing agent containing a surfactant containing a silicate is excessively high, a stain occurs on the substrate surface due to a liquid stain which is a residue of the washing liquid remaining after drying, and causes peeling of the deposited film. An excessively low temperature decreases the degreasing effect and the film forming effect, and makes it impossible to obtain a sufficient film, thereby causing difficulties in obtaining a high-quality deposited film. Therefore, the temperature is 10 to 60° C., preferably 15 to 50° C., more preferably 20 to 40° C.

In the present invention, when the concentration of the aqueous washing agent containing a surfactant used for washing is too high, a stain occurs due to the liquid stain which is a residue of the washing liquid remaining after drying and thus causes peeling of the deposited film or the like. An excessively low concentration decreases the degreasing effect and the film forming effect, and makes it impossible to obtain the benefits of the present invention. Therefore, the concentration by weight percentage of the surfactant containing a silicate in the aqueous washing agent is 0.1 to 20 wt %, preferably 1 to 10 wt %, more preferably 2 to 8 wt %.

In the present invention, when the aqueous washing agent has an excessively high pH and contains a surfactant used in the washing step, a stain occurs due to the liquid stain which is a residue of the washing liquid remaining after drying, and thus causes a flow of the deposited film. An excessively low pH decreases the degreasing effect and the film forming effect, and makes it impossible to obtain the benefits of the present invention. Therefore, the pH of the aqueous washing agent containing a surfactant is 8 to 12.5, preferably 9 to 12, more preferably 10 to 11.5.

When the silicate is contained too high a concentration in the water used for washing, a stain occurs due to a liquid stain which is a residue of the washing liquid remaining after drying, and thus causes peeling of the deposited film. Silicate at an excessively low concentration decreases the degreasing effect and the film forming effect, and makes it impossible to obtain the benefits of the present invention. Therefore, the molar concentration of the silicate contained in water is $10^{-6}$ to 10 mol/l, preferably $10^{-5}$ to $10^{-1}$ mol/l, more preferably $10^{-4}$ to $10^{-2}$ mol/l.

With the film formed to too small a thickness on the aluminum substrate, no effect appears. A film which is too thick causes the problem of deteriorating conductivity with the aluminum substrate. Therefore, the thickness of the. film is 5 to 150 angstroms, preferably 10 to 130 angstroms, more preferably 15 to 120 angstroms.

With respect to the composition ratios of the Al—Si—O film formed on the aluminum substrate, with small amounts of Si and O, the amount of the Al component is increased, and sufficient effects cannot be obtained. With large amounts of Si and O, conductivity is undesirably decreased. Therefore, the Si ratio is 0.1 to 1.0, preferably 0.15 to 0.8, more preferably 0.2 to 0.6, based on an Al ratio of 1. The O ratio is 1 to 5, preferably 1.5 to 4, more preferably 2 to 3.5, based on an Al ratio of 1.

In order to obtain the benefit of the present invention, it is effective to use ultrasonic waves in the washing step. The ultrasonic frequency is preferably 100 Hz to 10 MHz, more preferably 1 kHz to 5 MHz, most preferably 10 kHz to 100 kHz. The ultrasonic output is preferably 0.1 W/l to 1 kW/l, more preferably 1 W/1 to 100 W/l.

In the rinsing step or the drying step, carbon dioxide may be dissolved in the water used to improve the rinsing effect or the drying effect. In this case, the quality of the water used is very important; semiconductor-grade pure water, particularly super LSI-grade super pure water, is preferable as water before carbon dioxide is dissolved therein. Specifically, the lower limit of resistivity of water at 25° C. is 1 ΩQ·cm or more, preferably 3 ΩM·cm or more, more preferably 5 ΩM·cm or more. The upper limit of the resistance value may be any value up to the theoretical resistance value (18.25 Ω·cm); from the viewpoint of cost and productivity, the upper limit is 17 ΩM·cm or less, preferably 15 ΩM·cm or less, more preferably 13 ΩM·cm or less. As the amount of fine particles, the amount of particles of 0.2 μm or more is 10,000 or less per milliliter, preferably 1000 or less pre milliliter, more preferably 100 or less per milliliter. As the amount of microorganisms, the total number of viable cells is 100 or less per milliliter, preferably 10 or less per milliliter, more preferably 1 or less per milliliter. The total organic carbon (TOC) is 10 mg or less per milliliter, preferably 1 mg or less per milliliter, more preferably 0.2 mg or less per milliliter.

As the method of obtaining water having the above quality, an activated carbon method, a distillation method, an ion exchange method, a filtration method, a reverse osmosis method, an ultraviolet sterilization method, or the like can be used; a combination of at least two of these methods is preferably used for improving water quality to the required level.

The amount of carbon dioxide dissolved in the water may be any value up to the saturation solubility; an excessive amount of carbon dioxide causes the occurrence of bubbles when the water temperature changes, thereby producing stain spots due to the adhesion of the bubbles to the substrate surface in some cases. The excessive amount of carbon dioxide dissolved also decreases the pH, and thus the substrate is sometimes damaged. On the other hand, with too small an amount of carbon dioxide dissolved, the effect of the present invention cannot be obtained.

In consideration of the required quality of the substrate, etc., the amount of carbon dioxide dissolved must be optimized.

The amount of carbon dioxide dissolved is preferably 60% or less, more preferably 40% or less, of the saturation solubility.

It is practical to control the amount of carbon dioxide dissolved by controlling the conductivity or pH in the rinsing step. In the case of conductivity control, the conductivity is preferably in the range of 2 $\mu$s/cm to 40 $\mu$s/cm, more preferably 4 $\mu$s/cm to 30 $\mu$s/cm, most preferably 6 $\mu$s/cm to 25 $\mu$s/cm. In the case of pH control, the pH is preferably in the range of 3.8 to 6.0, more preferably 4.0 to 5.0, in order to obtain the benefit of the present invention. The conductivity is measured by a conductivity meter or the like, and converted to a value at 25° C. by temperature correction.

The temperature of water is 5° C. to 90° C., preferably 10° C. to 55° C., more preferably 15° C. to 40° C.

As the method of dissolving carbon dioxide in water, a bubbling method, a method using a diaphragm, and the like may be used. In the present invention, the use of water containing carbon dioxide dissolved therein can prevent the influence of cations such as sodium ions on the substrate, which is possibly caused when a carbonate such as sodium carbonate is used for obtaining carbonate ions. In washing the substrate surface with the thus-obtained water in which carbon dioxide is dissolved, it is effective to perform the washing method comprising dipping before or after the method of spraying water under water pressure in accordance with the present invention.

In the case of washing by dipping, the substrate is basically dipped in a water bath; it is more effective to combine dipping and bubbling by applying ultrasonic waves, applying a water flow, or introducing air.

In the present invention, the twisted positional relationship between the shower nozzles provided in the adjacent rings is not limited, but it is effective for the present invention that each of the nozzles arranged at equal intervals in one of the rings is positioned at an intermediate position between the adjacent nozzles provided in the other ring.

As the shape of the nozzles used for washing under high pressure, the use of nozzles having any one of a sector shape, a conical shape, and the like is effective for the present invention as long as the nozzles have a spray angle of 60° to 120°.

As the shape of the ring on which a plurality of nozzles used for washing under high pressure are arranged, any one of a circular shape, an elliptical shape, a polygonal shape, and the like is effective as long as the cylindrical substrate is surrounded by the ring; particularly a circular shape is effective for the present invention.

With the water under too low spray pressure, the present invention exhibits a slight effect, while with the water under too high spray pressure, a stain-like stipple occurs in an image formed on the electrophotographic photosensitive member, particularly a halftone image.

As the direction in which the nozzles used in the present invention are arranged, any spray direction with respect to the substrate is effective. However, if the direction perpendicular to the substrate is 0°, and the counterclockwise direction in the lengthwise direction of the substrate is +, the effective direction is 0° to 60°.

The number of the nozzles used in the present invention may be at least one in a range which can cover the cylindrical substrate; the optimum number is at least 3 because at least three points are preferably required for defining a circle.

With the water under too low a spray pressure, the present invention exhibits a slight effect, while with the water under too high a spray pressure, a stain-like stipple occurs in an image formed on the electrophotographic photosensitive member, particularly a halftone image. Therefore, the pressure of water is 5 kg·f/cm$^2$ to 50 kg·f/cm$^2$, preferably 8 kg·f/cm2 to 40 kg·f/cm$^2$, more preferably 10 kg·f/cm$^2$ to 30 kg·f/cm$^2$. The pressure unit kg·f/cm$^2$ means kilogram-force per square centimeter; 1 kg·f/cm$^2$ equals 98066.5 Pa.

Methods of spraying water include a method of spraying water pressurized by using a pump through nozzles, a method comprising mixing water drawn by a pump and high-pressure air before spraying from nozzles, and then spraying water by means of the pressure of the air, and the like.

From the viewpoints of the effect of the present invention and economy, the flow rate of water is in the range of 1 l/min to 200 l/min, preferably 2 l/min to 100 l/min, more preferably 5 l/min to 50 l/min, per substrate.

The processing time of washing with the water in which carbon dioxide is dissolved is 10 seconds to 30 minutes, preferably 20 seconds to 20 minutes, more preferably 30 seconds to 10 minutes.

In pull-up drying, the pull-up rate is very important, and is preferably in the range of 100 mm/min to 2,000 mm/min. more preferably 200 mm/min, most preferably 300 mm/min to 1,000 mm/min. With an excessively long time taken from washing with the water in which carbon dioxide is dissolved to setting in the deposited film forming apparatus, the water which is vapoorizingpresent invention exhibits a slight effect, while with an excessively short time, stability cannot be obtained. Therefore, the time is 1 minute to 8 hours, preferably 2 minutes to 4 hours, more preferably 3 minutes to 2 hours.

In the present invention, a silicate may be added in at least one of the rinsing step and the drying step. With the water containing a silicate at an excessively high concentration, a stain occurs due to the water which is vapoorizing, thereby causing peeling of the deposited film. The addition of an excessively low concentration of silicate decreases the degreasing effect and the film forming effect, and thus the effect of the present invention cannot be sufficiently obtained. Therefore, the molar concentration of the silicate contained in water is in the range of $10^0$ to $10^{-6}$, preferably $10^{-1}$ to $10^{-5}$, more preferably $10^{-2}$ to $10^{-4}$. The pH of the water containing the silicate used for washing after surface processing is 8 to 12.5, preferably 9 to 12, more preferably 10 to 11.5.

In the present invention, the substrate may be made of a material mainly composed of aluminum; a material suitable for the present invention is as follows:

The aluminum substrate contains 10 ppm or more of Fe, 10 ppm or more of Si, and 10 ppm or more of Cu, with the total content (Fe+Si+Cu) of 0.01 wt % to 1 wt %.

In order to improve processability of the substrate, it is effective to contain magnesium. The content of magnesium is preferably in the range of 0.1 wt % to 10 wt %, more preferably 0.2 wt % to 5 wt %.

It is also effective that the aluminum substrate contains any of H, Li, Na, K, Be, Ca, Ti, Cr, Mn, Fe, Co, Ni, Cu, Ag, Zn, Cd, Hg, B, Ca, In, C, Si, Ge, Sn, N, P, As, O, S, Se, F, Cl, Br, I, and the like.

The shape of the substrate is determined according to demand; for example, when the substrate is used for electrophotography, in the case of a continuous high-speed copying machine, an endless belt or the above-described cylindrical shape is optimum for the present invention. In the case of the cylindrical shape, the size of the substrate is not limited, but the diameter is preferably 20 mm to 500 mm, and the length is preferably 10 mm to 1,000 mm, for practical use. The thickness of the support member is appropriately determined so as to form a desired photoconductive member; in cases in which the photoconductive member is required to have flexibility, the thickness is made as small as possible in a range in which the function as the support member is sufficiently exhibited. However, even in such cases, from the viewpoint of production and handling of the support member, or mechanical strength thereof, the thickness is preferably 10 $\mu$m or more.

The photosensitive material used in the present invention may be any one of an amorphous silicon photosensitive material, a selenium photosensitive material, a cadmium sulfide photosensitive material, organic photosensitive materials, and the like; particularly a non-single crystal photosensitive material containing silicon, such as an amorphous silicon photosensitive material, exhibits a significant effect.

In the case of the non-single crystal photosensitive material containing silicon, examples of the raw material gases used in formation of the deposited film include raw material gases for forming amorphous silicon, such as silane ($SiH_4$), disilane ($Si_2H_6$), silicon tetrafluoride ($SiF_4$), disilicon hexafluoride ($Si_2F_6$), and mixed gases thereof.

Examples of dilution gases include hydrogen ($H_2$), argon (Ar), helium (He), and the like.

Characteristic modifying gases for changing the band gap width of the deposited film include nitrogen ($N_2$); gases containing nitrogen atoms, such as ammonia ($NH_3$), and the like; gases containing oxygen atoms such as nitrogen monoxide (NO), nitrogen dioxide ($NO_2$), dinitrogen oxide ($N_2O$ ), carbon monoxide (CO), carbon dioxide ($CO_2$), and the like; hydrocarbons such as methane ($CH_4$), ethane ($C_2H_6$), ethylene ($C_2H_4$), acetylene ($C_2H_2$), propane ($C_3H_8$), and the like; fluorine compounds such as germanium tetrafluoride ($GeF_4$), nitrogen fluoride ($NF_3$), and the like; and gas mixtures thereof.

It is also effective for the present invention that for doping, a dopant gas such as diborane ($B_2H_6$), boron fluoride ($BF_3$), phosphine ($PH_3$), or the like is simultaneously introduced into the discharge space.

In the electrophotographic photosensitive member of the present invention, the total thickness of the deposited film deposited on the substrate is not limited; in order to obtain good images on the electrophotographic photosensitive member, the total thickness is 5 $\mu$m to 100 $\mu$m, more preferably 10 $\mu$m to 70 $\mu$m, most preferably 15 $\mu$m to 50 $\mu$m.

In deposition of the deposited film, the effect is exhibited in any range of pressure of the discharge space; the pressure is 0.5 mtorr to 100 mtorr, preferably 1 mtorr to 50 mtorr, in order to obtain particularly good results of discharge stability and uniformity of the deposited film with high reproducibility.

In deposition of the deposited film, the effective temperature of the substrate is in the range of 100° C. to 500° C.; particularly a significant effect is exhibited at 150° C. to 450° C., preferably 200° C. to 400° C., more preferably 250° C. to 350° C.

As means for heating the substrate, a heating element used in a vacuum may be used. Examples of such heating means include electric resistance heating elements such as a sheath-like wound heater, a plate heater, a ceramic heater, and the like; heat radiation lamp heating elements such as a halogen lamp, an infrared lamp, and the like; heating elements comprising heat exchange means using a liquid, a gas, or the like as a thermal medium; and the like. As the surface material of the heating means, a metal such as stainless steel, nickel, aluminum, copper, or the like; ceramics; a heat-resistant polymer resin or the like can be used. Besides the above means, a method can be used in which a vessel used only for heating is provided separately of the reactor so that the substrate is transferred into the reactor under a vacuum after heating. In the present invention, the above means can be used singly or in combination.

Energy for generating a plasma may be any of DC, RF, microwaves, and the like. Particularly, in the use of microwaves as energy for generating a plasma, it is possible to effectively prevent abnormal growth due to surface defects. In general, microwaves are easily absorbed by adsorbed water, with significantly changing the interface. However, in the present invention, the use of microwaves causes little change in the interface. It is also preferable to use a VHF band. In the use of microwaves for generating a plasma, the electric power of the microwaves is not limited as long as discharge can be generated; an electric power of 100 W to 10 kW, preferably 500 W to 4 kW, is preferable for carrying out the present invention.

It is also effective to apply a voltage (a bias voltage) to the discharge space during formation of the deposited film; an electric field is preferably applied in a direction in which cations collide with at least the substrate. During formation of the deposited film, it is preferably to apply a bias voltage with the DC component at a voltage of 1 V to 500 V, more preferably 5 V to 100 V.

When the microwaves are introduced into the reactor by using a dielectric window, materials generally used for the dielectric window include materials which cause little loss of microwaves, such as alumina ($Al_2O_3$), aluminum nitride (AlN), boron nitride (BN), beryllium oxide (BeO), Teflon, polystyrene, and the like.

In a deposited film forming method in which the discharge space is surrounded by a plurality of substrates, the substrate interval is preferably 1 mm to 50 mm. The number of substrates is not limited as long as the discharge space can be formed; the number of the substrates is preferably 3 or more, more preferably 4 or more.

Although the present invention can be applied to any method of producing an electrophotographic photosensitive member, the present invention is particularly effective for a method of forming a deposited film in which substrates are provided to surround the discharge space so that microwaves are introduced from at least one end side of the substrates from a wave guide.

The electrophotographic photosensitive member produced by the method of the present invention can be widely used not only for an electrophotographic copying machine but also for the electrophotographic applied field including a laser printer, a CRT printer, a LED printer, a liquid crystal printer, a laser plate making machine, and the like.

Although experimental examples and examples of the present invention are described below, the present invention is not limited to these examples.

EXAMPLE 1

The surface of a cylindrical substrate made of aluminum containing 0.05 wt % of Si, 0.03 wt % of Fe, and 0.01 wt % of Cu, and having a diameter of 108 mm, a length of 358 m, and a thickness of 5 mm was cut according to the same procedure previously described for cutting a mirror surface on the aluminum substrate. In the present invention, the ratios of all atoms present on the substrate are the values obtained by measurement by using X-ray photoelectric spectrometry under conditions in which an X-ray anode has 15 kV and 400 W, the energy resolution is 0.98 eV (Ag3d5/2), and the degree of vacuum is $1\times\mathbf{10}^{-9}$ torr or less.

!5 minutes after the cutting step, the substrate was degreased with a detergent (a nonionic surfactant), rinsed and then dried under the conditions shown in Table 1 by the surface processing apparatus of the present invention shown in FIG. 1. The inhibitor used in experimental examples of the present invention was A Potassium Silicate (trade name) produced by Nippon Chemical Industrial Co., Ltd. A Potassium Silicate was a solution in which 400 g of potassium silicate ($K_2O{\cdot}3SiO_2$) was dissolved in 1 Kg of water. The pH value of water in which A Potassium Silicate was dissolved was 11.0.

Figure 6A:
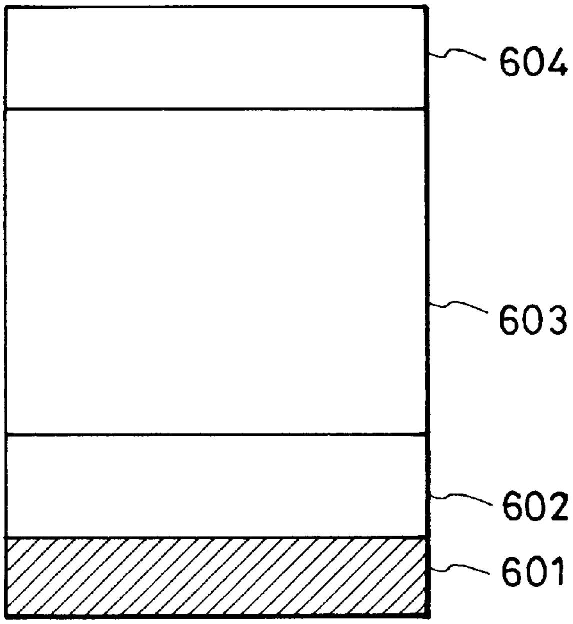
FIGS. 6A and 6B are sectional views respectively showing layer structures of an electrophotographic photosensitive member.

In the shower nozzles of the present invention shown in FIG. 7, the setting angle of the nozzles was changed as shown in Table 3 to visually evaluate the appearance of the surface of the substrate. In this example, the shower nozzles were arranged in the same number on two rings including upper and lower rings so that the nozzles on the lower ring were respectively positioned between the nozzles on the upper ring. The results are shown in Table 3. On the substrate subjected to the above surface processing was formed an amorphous silicon deposited film by using the deposited film forming apparatus shown in FIG. 3 under the conditions shown in Table 2 to produce a blocking type electrophotographic photosensitive member having the layer structure shown in FIG. 6. In FIG. 6, reference numerals 601, 602, 603 and 604 denote an aluminum substrate, a blocking layer for charge injection, a photoconductive layer, and a surface layer, respectively.

The electrophotographic characteristics of the thus-formed electrophotographic photosensitive member were evaluated as follows:

In an experiment, the electrophotographic photosensitive member was previously subjected to corona discharge by applying a voltage of 6 to 7 V to a charger with the process speed changed to any desired value in the range of 200 to 800 mmsec, followed by laser image exposure at 788 nm to form a latent image on the surface of the electrophotographic photosensitive member. Then, the electrophotographic photosensitive member was set in Canon copying machine NP6650 which was modified so that an image can be formed on transfer paper by a normal copying process, to evaluate density nonuniformity in a halftone image. The results are shown in Table 3.

Visual Evaluation of Appearance

After washing, strong exposure light was reflected from the surface of the substrate to synthetically evaluate the states of visible stains on the substrate and surface roughness of the substrate surface.

@. . . Very good

○. . . Good

Δ. . . No practical problem

Evaluation of Image Nonuniformity

An A3 grid sheet (produced by Kokuyo Co.) was placed on an original base, and the amount of exposure for the original was changed by changing the diaphragm of the copying machine so as to obtain images ranging from an image in which the graph lines could hardly be observed to an image in which a white portion was fogged, to output 10 copies having different densities.

The thus-obtained images were observed at a distance of 40 cm from the eyes to examine whether a density difference was observed according to the following criteria:

@. . . No nonuniformity was observed in the images on all copies.

○. . . Nonuniformity was observed in the images on some of the copies, but it was small and had no problem.

Δ. . . Nonuniformity was observed in the images on all copies, but it was small in an image on at least one copy and had no practical problem.

x . . . Significant nonuniformity was observed in the images on all copies.

TABLE 1

| Processing conditions | Degreasing and washing step | Rinsing step | Drying step |
|---|---|---|---|
| Processing agent contained in water | Nonionic surfactant | Aqueous carbon dioxide solution (20 μS/cm) | Aqueous carbon dioxide solution (20 μS/cm) |
| Temperature | 40° C. | 25° C. | 40° C. |
| Conditions of high-pressure rinsing | — | Pressure: 10 kgf/cm$^2$ Number of nozzles: 6 Number of ring stages: 2 | — |
| Processing time | 5 minutes | 40 seconds | 1 minute |
| Others | Ultrasonic processing | — | — |

TABLE 2

| | Blocking layer for charge injection | Photoconductive layer | Surface layer |
|---|---|---|---|
| Type of gas and flow rate: | | | |
| $SiH_4$ (sccm) | 200 | 400→430→430 | 186→169→30→25 |
| $H_2$ (sccm) | 400 | 800→1250→1250 | |
| $B_2H_6$ (sccm) (for $SiH_4$) | 1500 | 1.25 | |
| NO (sccm) | 6.5 | | |
| $CH_4$ (sccm) | — | | 751→848→1448→1527 |
| Internal pressure (mTorr) | 285 | 285→550→550 | |

TABLE 2-continued

| | Blocking layer for charge injection | Photoconductive layer | Surface layer |
|---|---|---|---|
| Power (W) | 160 | 320→700→700 | |
| Time (min) | 34 | Initial 10 + 350 | |

TABLE 3

| Nozzle angle | Observation of appearance | Evaluation of image density |
|---|---|---|
| −5 | ○ | ○ |
| 0 | ◎ | ◎ |
| +5 | ◎ | ◎ |
| +10 | ◎ | ◎ |
| +25 | ◎ | ◎ |
| +40 | ◎ | ◎ |
| +50 | ◎ | ◎ |
| +60 | ◎ | ◎ |
| +70 | ○ | ○ |
| +80 | Δ | ○ |

Table 3 indicates that good results are obtained in the range of nozzle angles of +0° to 60°.

EXAMPLE 2

The same method as Example 1 was repeated except that the setting angle of the shower nozzles was +30°, and the spray angle of the washing solution sprayed from the nozzles was shown in Table 4 to form blocking type electrophotographic photosensitive members. The same evaluation as Example 1 was repeated, and the results are shown in Table 4.

TABLE 4

| Spray angle of nozzle | Observation of appearance | Evaluation of image density |
|---|---|---|
| 15° | ○ | ○ |
| 30° | ○ | ○ |
| 45° | ○ | ○ |
| 60° | ◎ | ◎ |
| 90° | ◎ | ◎ |
| 120° | ◎ | ◎ |
| 130° | ○ | ○ |
| 160° | ○ | ○ |

Table 4 indicates that good results are obtained in the range of nozzle spray angles of 60° to 120°.

EXAMPLE 3

The same method as Example 1 was repeated except that the setting angle of the shower nozzles was +30°, the spray angle was 100°, and pressure was changed as shown in Table 6 to form blocking type electrophotographic photosensitive members. The same evaluation as Example 1 was repeated, and the results are shown in Table 5.

TABLE 5

| Spray pressure ($kgf/cm^2$) | Observation of appearance | Evaluation of image density |
|---|---|---|
| 2 | ○ | ◎ |
| 5 | ◎ | ◎ |
| 15 | ◎ | ◎ |
| 30 | ◎ | ◎ |
| 40 | ◎ | ◎ |
| 50 | ◎ | ◎ |
| 80 | ○ | ◎ |
| 100 | ○ | ◎ |

Table 5 indicates that good results are obtained in the range of 5 $kgf/cm^2$ to 50 $kgf/cm^2$.

EXAMPLE 4

The same substrate as Example 1 was degreased by washing (using a nonionic surfactant), rinsed and then dried under the conditions shown in Table 6. In this example, a bath containing an inhibitor was changed as shown in Table 7. Electrophotographic photosensitive members were produced by the same method as Example 1, and images were formed by the same method, and then synthetically evaluated with respect to black stains, image defects, electrophotographic characteristics (sensitivity), and environmental properties. The results are also shown in Table 7.

Table 7 indicates that the use of the inhibitor in at least one of the degreasing and washing step and the rinsing step can improve electrophotographic performance.

TABLE 6

| Processing conditions | Degreasing and washing step | Rinsing step | Drying step |
|---|---|---|---|
| Processing agent contained in water | Nonionic surfactant | Pure water (10 MΩ-cm) | Pure water (10 MΩ-cm) |
| Temperature | 40° C. | 25° C. | 40° C. |
| Processing time | 5 minutes | 40 seconds | 1 minute |
| Others | Ultrasonic processing | | — |
| Rinsing Conditions | | Pressure: 20 $kgf/cm^2$ Spray angle: 90° Number of nozzles: 6 Direction of nozzle: +45° Number of ring stages: 2 | — |

TABLE 7

| | Degreasing and washing step | Rinsing step | Drying step | Results of overall evaluation of black stain and image defect | Environmental properties |
|---|---|---|---|---|---|
| Potassium silicate | ◎ | — | — | ○ | ○ |
| | — | ◎ | — | ○ | ○ |
| | — | — | ◎ | x | ○ |
| | ◎ | ◎ | — | ○ | ○ |
| | ◎ | — | ◎ | ○ | ○ |
| | — | ◎ | ◎ | ○ | ○ |
| | ◎ | ◎ | ◎ | ○ | ○ |
| Comparative | — | — | — | x | ○ |

TABLE 7-continued

| | Degreasing and washing step | Rinsing step | Drying step | Results of overall evaluation of black stain and image defect | Environ-mental properties |
|---|---|---|---|---|---|
| Example 1 | | | | | |
| Conventional Example 1 | — | — | — | ○ | x |

(Note)
* shows that the inhibitor (potassium silicate) was added, and
— shows that the inhibitor was not added.

Evaluation of Black Stain and Image Defect

A whole halftone original and a character original were placed on the original base and copied while the process speed was changed. Of the thus-obtained image samples, an image sample having the most number of image defects was selected and evaluated. In the evaluation method, the image sample was observed by a magnifying glass to evaluate the state of white spots in the same area.

@. . . Good

○. . . Small defects were observed in a portion with no problem.

Δ. . . Small defects were observed over the entire area with no practical problem.

x . . . Large defects were observed over the entire area.

Evaluation of Environmental Properties

○. . . No substance contributing to destruction of the ozone layer was used in the pre-processing step.

x . . . A substance contributing to destruction of the ozone layer was used in the pre-processing step.

Table 7 reveals that good results are obtained by adding the inhibitor to the surfactant or immediately after the use of the surfactant.

Comparative Example 1

Washing was carried out by the same method as Example 4 except that the inhibitor was not used in the washing step, and a blocking type electrophotographic photosensitive member was produced by the same method and evaluated by the same method. The results are also shown as Comparative Example 1 in Table 7.

Conventional Example 1

Figure 2:
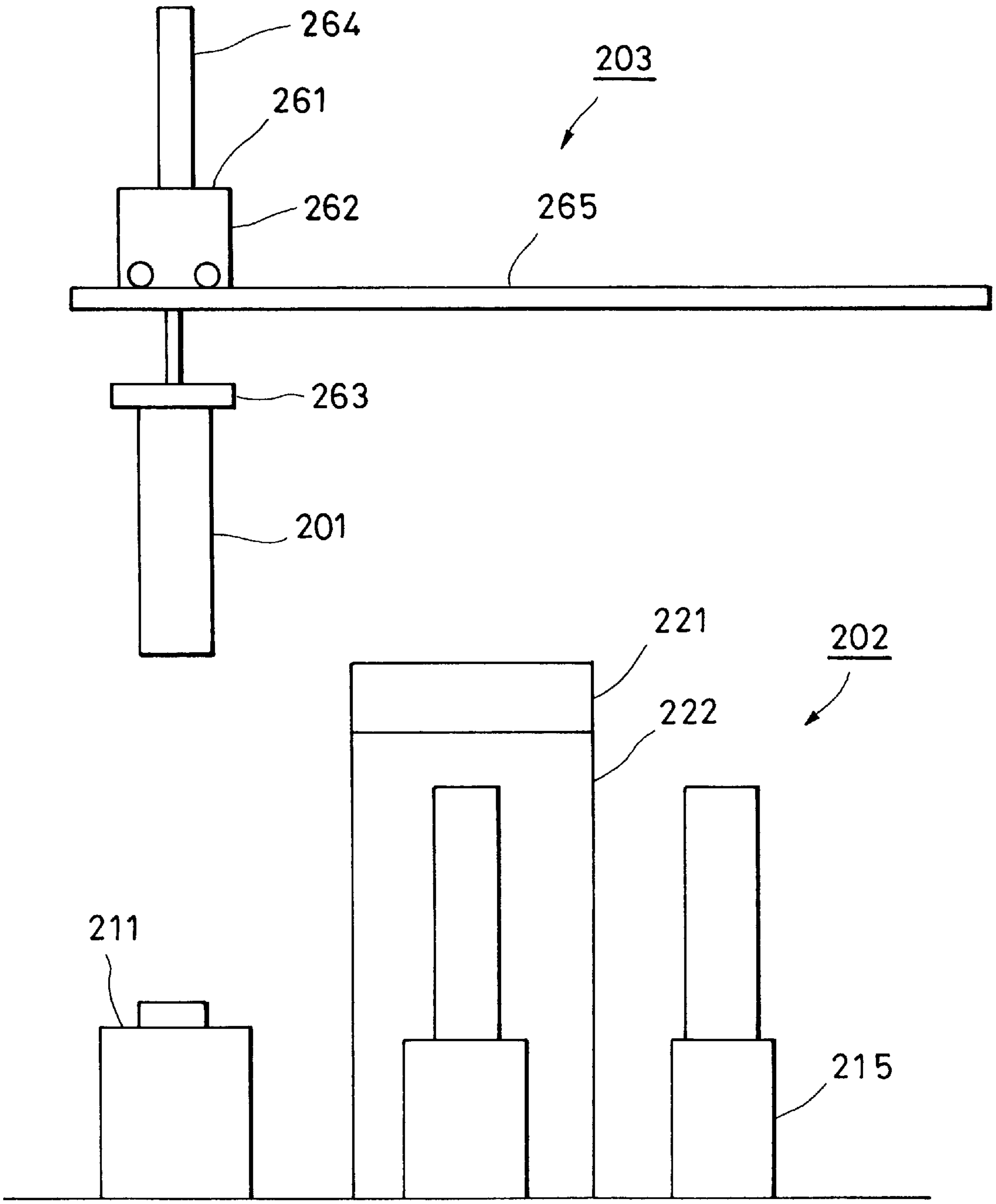
FIG. 2 is a schematic sectional view of a washing apparatus for washing a substrate by a conventional method.

The same aluminum cylindrical substrate as Example 1 was subjected to surface cutting, and then degreased and washed by the conventional surface washing apparatus shown in FIG. 2 under the conditions shown in Table 8. The substrate washing apparatus shown in FIG. 2 comprises a processing bath 202 and a substrate transfer mechanism 203. The processing bath 202 comprises a substrate setting base 211, a substrate washing bath 221, and a substrate transfer base 215. The washing bath 221 comprises a temperature controller (not shown) for keeping the liquid temperature constant. The transfer mechanism 203 comprises a transfer rail 265 and a transfer arm 261, and the transfer arm 261 comprises a movement mechanism 262 which moves on the rail 265, a chucking mechanism 263 for holding a substrate 201, and an air cylinder 264 for moving upward and downward the chucking mechanism 263.

After cutting, the substrate 201 placed on the setting base 211 is transferred to the washing bath 221 by the transfer mechanism 203. In the washing bath 221, the substrate 201 is washed with trichloroethane (trade name: Ethaner VG produced by Asahi Chemical Industry Co., Ltd.) 222 to remove the cutting oil and cutting dust, which adhered to the surface.

After washing, the substrate 201 was transferred to the transfer base 215 by the transfer mechanism 203.

Then, an electrophotographic photosensitive member was produced by the same method as Example 1.

The thus-formed electrophotographic photosensitive member was evaluated by the same method as Example 5, and the results are shown as Conventional Example 1 in Table 7.

EXAMPLE 5

Blocking type electrophotographic photosensitive members were formed by the same method as Example 1 except that the water shown in Table 9 was used in the rinsing step and the drying step shown in Table 6 of Example 1, and then evaluated by the same method as Example 4. The results are show in Table 10.

TABLE 8

| | Washing step |
|---|---|
| Processing agent | 1,1,1-trichloroethane |
| Temperature | 50° C. |
| Processing time | 3 minutes |
| Others | Ultrasonic processing |

TABLE 9

| | Rinsing step | Drying step |
|---|---|---|
| Example 6 | | |
| (1) | Pure water (10 MΩ · cm) | Aqueous carbon dioxide solution (20 μS/cm) |
| (2) | Aqueous carbon dioxide solution (20 μS/cm) | Pure water (10 MΩ · cm) |
| (3) | Aqueous carbon dioxide solution (20 μS/cm) | Aqueous carbon dioxide solution (20 μS/cm) |

TABLE 10

| Degreasing step | Rinsing step | Drying step | Results of overall evaluation of black stain and image defect | Environ-mental properties |
|---|---|---|---|---|
| Potassium silicate | | | | |
| * | (1) — | — | ○ | ○ |
| | (2) — | — | ○ | ○ |
| | (3) — | — | ○ | ○ |
| — | (1) * | — | ○ | ○ |
| | (2) * | — | ○ | ○ |
| | (3) * | — | ○ | ○ |
| — | (1) — | * | x | ○ |
| | (2) — | * | ○ | ○ |
| | (3) — | * | ○ | ○ |
| * | (1) * | — | x | ○ |
| | (2) * | — | ○ | ○ |
| | (3) * | — | ○ | ○ |
| * | (1) — | * | ○ | ○ |
| | (2) — | * | ○ | ○ |
| | (3) — | * | ○ | ○ |

TABLE 10-continued

| Degreasing step | Rinsing step | Drying step | Results of overall evaluation of black stain and image defect | Environmental properties |
|---|---|---|---|---|
| — | (1) * | * | ○ | ○ |
| | (2) * | * | ○ | ○ |
| | (3) * | * | ○ | ○ |
| — | (1) * | * | ○ | ○ |
| | (2) * | * | ○ | ○ |

Table 10 indicates that even if a combination of an aqueous carbon dioxide solution and pure water is used in the drying step, good results are obtained by adding the inhibitor in the use of the surfactant or immediately after the use of the surfactant.

EXAMPLE 6

The same substrate as Example 1 was washed by the method shown in Table 11 while the type of the silicate was changed as shown in Table 12. Blocking type photographic photosensitive members were formed by the same method as Example 1, and then evaluated by the same method as Example 4. The results are shown in Table 12.

TABLE 11

| Processing conditions | Degreasing and washing step | Rinsing step | Drying step |
|---|---|---|---|
| Processing agent contained in water | Nonionic surfactant | Pure water (10 MΩ-cm) | Pure water (10 MΩ-cm) |
| Temperature | 40° C. | 25° C. | 40° C. |
| Processing time | 5 minutes | 40 seconds | 1 minute |
| Others | Ultrasonic processing | —<br>— | — |
| Conditions of high-pressure rinsing | — | Pressure: 20 $kgf/cm^2$<br>Spray angle: 100°<br>Number of nozzles: 6<br>Direction of nozzle: +30°<br>Number of ring stages: 2 | — |
| Inhibitor | * | — | — |

(Note)
* indicates that the inhibitor (potassium silicate) was added.

TABLE 12

| | Overall evaluation of black stain and image defect |
|---|---|
| Inhibitor | |
| Potassium silicate | ⊚ |
| Sodium silicate | ○ |
| Magnesium silicate | ○ |

Table 12 indicates that the use of any silicate produces good results, but the use of potassium silicate produces particularly good results.

EXAMPLE 7

The same substrate as Example 1 was washed by the method shown in Table 7. In this example, the concentration of potassium silicate was changed as shown in Table 15 to visually observe the state of stains on the substrate surfaces after washing. Then, blocking type photographic photosensitive members were formed by the same method as Example 1, and then evaluated by the same method as Example 4. The results are shown in Table 13.

Observation of Appearance (stains)

After washing, strong light was reflected from the substrate surface to observe visible stains on the substrate.

@. . . Good results without no stain

Δ. . . Slight stains with no problem x . . . Significant stains

TABLE 13

| | Concentration of potassium silicate (%) | Appearance (stains) | Overall evaluation of black spot and image defect |
|---|---|---|---|
| Experimental Example | | | |
| (1) | $1 \times 10^{-6}$ | Δ | Δ |
| (2) | $1 \times 10^{-5}$ | ○ | ○ |
| (3) | $1 \times 10^{-4}$ | ⊚ | ⊚ |
| (4) | $1 \times 10^{-3}$ | ⊚ | ⊚ |
| (5) | $1 \times 10^{-2}$ | ⊚ | ⊚ |
| (6) | $1 \times 10^{-1}$ | ○ | ○ |
| (7) | $1 \times 10^{0}$ | Δ | Δ |

Table 13 reveals that good results are obtained when the molar concentrations of potassium silicate dissolved in water is in the range of $10^{-6}$ to $10^{0}$.

EXAMPLE 8

An aluminum substrate was degreased and washed by the same method as Example 4 while the Si content of the substrate was changed as shown in Table 15. Then, blocking type photographic photosensitive members were formed by the same method as Example 1, and then evaluated by the same method as Example 4. The results are shown in Table 14.

TABLE 14

| | Si content (wt %) | Overall evaluation of black spot and image defect |
|---|---|---|
| Example 8 | | |
| (1) | 0.001 | ○ |
| (2) | 0.002 | ⊚ |
| (3) | 0.04 | ⊚ |
| (4) | 0.08 | ⊚ |
| (5) | 0.53 | ⊚ |
| (6) | 0.72 | ⊚ |
| (7) | 0.99 | ⊚ |
| (8) | 1.0 | ○ |
| (9) | 1.13 | Δ |

Table 14 reveals that the present invention is effective even when the Si content is changed in 0.001 wt % $\leqq$Si$\leqq$1 wt %.

EXAMPLE 9

Blocking type photographic photosensitive members were formed by the same method as Example 1 except that the Fe content was changed as shown in Table 15, and then evaluated by the same method as Example 5. The results are shown in Table 15.

TABLE 15

| | Fe content (wt %) | Overall evaluation of black spot and image defect |
|---|---|---|
| Example 6 | | |
| (1) | 0.001 | ○ |
| (2) | 0.003 | ⊚ |
| (3) | 0.04 | ⊚ |
| (4) | 0.08 | ⊚ |
| (5) | 0.48 | ⊚ |
| (6) | 0.61 | ⊚ |
| (7) | 0.99 | ⊚ |
| (8) | 1.0 | ○ |
| (9) | 1.13 | Δ |

Table 15 indicates that good results are obtained in the range of 0.001 wt % ≦Fe≦1 wt %.

EXAMPLE 10

Blocking type photographic photosensitive members were formed by the same method as Example 1 except that the Cu content was changed, and then evaluated by the same method as Example 4. The results are shown in Table 16.

TABLE 16

| | Cu content (wt %) | Overall evaluation of black spot and image defect |
|---|---|---|
| Example 10 | | |
| (1) | 0.001 | ○ |
| (2) | 0.003 | ⊚ |
| (3) | 0.03 | ⊚ |
| (4) | 0.09 | ⊚ |
| (5) | 0.46 | ⊚ |
| (6) | 0.58 | ⊚ |
| (7) | 0.99 | ⊚ |
| (8) | 1.0 | ○ |
| (9) | 1.11 | Δ |

Table 16 indicates that good results are obtained in the range of 0.001 wt % ≦Cu≦1 wt %.

EXAMPLE 11

Degreasing and washing was performed by the same method as Example 1 except that the Si, Fe and Cu contents of aluminum were changed as shown in Table 17. Blocking type photographic photosensitive members were formed by the same method as Example 1, and then evaluated by the same method as Example 4. The results are shown in Table 17.

TABLE 17

| | Si | Fe | Cu | Results of overall evaluation of black spot and image defect |
|---|---|---|---|---|
| Example 11 | | | | |
| (1) | 0.004 | 0.003 | 0.003 | ○ |
| (2) | 0.005 | 0.004 | 0.002 | ⊚ |
| (3) | 0.005 | 0.02 | 0.001 | ⊚ |
| (4) | 0.02 | 0.02 | 0.005 | ⊚ |
| (5) | 0.02 | 0.001 | 0.05 | ⊚ |
| (6) | 0.1 | 0.02 | 0.05 | ⊚ |
| (7) | 0.2 | 0.25 | 0.01 | ⊚ |
| (8) | 0.4 | 0.3 | 0.3 | ⊚ |
| (9) | 0.3 | 0.4 | 0.4 | ○ |

Table 17 indicates that the present invention is effective in the range of 0.001 wt % ≦Si+Fe+Cu≦1 wt %.

EXAMPLE 12

The same substrate as Example 1 was used, and the processing temperature and time were changed under the conditions shown in Table 18 to change the thickness of the deposited film. Blocking type photographic photosensitive members were formed by the same method as Example 1, and then evaluated by the same method. The results are shown in Table 19.

TABLE 18

| Processing conditions | Degreasing and washing step | Rinsing step | Drying step |
|---|---|---|---|
| Processing agent contained in water | Nonionic surfactant | Pure water (10 MΩ-cm) | Aqueous carbon dioxide solution (20 μS/cm) |
| Temperature | changing | 25° C. | 40° C. |
| Processing time | changing | 3 minutes | 1 minute |
| Inhibitor | Potassium silicate | — | — |
| Rinsing Conditions | | Pressure: 20 kgf/cm$^2$ Spray angle: 98° Number of nozzles: 6 Direction of nozzle: +40° Number of ring stages: 2 | — |

TABLE 19

| | Film thickness (Å) | Results of Overall evaluation of black spot and image defect |
|---|---|---|
| Example 12 | | |
| (1) | 3 | ○ |
| (2) | 5 | ⊚ |
| (3) | 17 | ⊚ |
| (4) | 28 | ⊚ |
| (5) | 42 | ⊚ |
| (6) | 60 | ⊚ |
| (7) | 86 | ⊚ |
| (8) | 110 | ⊚ |
| (9) | 119 | ⊚ |
| (10) | 150 | ⊚ |
| (11) | 165 | ○ |

EXAMPLE 13

The same substrate as Example 1 was used, and the processing temperature and time were changed under the conditions shown in Table 20 to form films under the conditions shown in Table 16. In this example, the ratios of Al, Si and O were changed. Blocking type photographic photosensitive members were formed by the same method as Example 1, and then evaluated. The results are shown in Table 21. The composition ratios were measured by the XPS method shown in Example 1.

TABLE 20

| | Degreasing and washing step | Rinsing step | Drying step |
|---|---|---|---|
| Washing condition | Nonionic surfactant | Pure water (10 MΩ-cm) | Aqueous carbon dioxide solution (20 μS/cm) |
| Temperature | changing | 25° C. | 40° C. |
| Processing time | changing | 3 minutes | 1 minute |
| Film thickness | 70 Å | — | — |
| Inhibitor | Potassium silicate | — | — |
| Conditions of high-pressure rinsing | — | Pressure: 20 kgf/cm$^2$<br>Spray angle: 72°<br>Number of nozzles: 6<br>Direction of nozzle: +45°<br>Number of ring stages: 2 | — |

TABLE 21

| | O content | | | | | |
|---|---|---|---|---|---|---|
| Si content | 0.5 | 1 | 3 | 5 | 8 | 10 |
| 0.05 | ○ | ○ | ○ | ○ | ○ | ○ |
| 0.1 | ○ | ◎ | ◎ | ◎ | ◎ | ○ |
| 0.3 | ○ | ◎ | ◎ | ◎ | ◎ | ○ |
| 0.5 | ○ | ◎ | ◎ | ◎ | ◎ | ○ |
| 0.8 | ○ | ○ | ○ | ○ | ○ | ○ |
| 1.0 | ○ | ◎ | ◎ | ◎ | ◎ | ○ |
| 1.2 | ○ | ○ | ○ | ○ | ○ | ○ |

Each numeral shows the ratio of oxygen or Si to Al in case of that the number of Al atoms is regarded as 1. Table 21 reveals that good results are obtained in the range of Si ratios of 0.1 to 1.0, and in the range of O ratios of 1 to 5.

EXAMPLE 14

The surface of a cylindrical substrate composed of aluminum containing 0.03 wt % of Si, 0.05 wt % of Fe and 0.02 wt % of Cu, and having a diameter of 108 mm, a length of 358 mm and a thickness of 5 mm was cut according to the same procedure as an example of the method of producing an electrophotographic photosensitive member of the present invention. 15 minutes after the cutting step, the surface of the substrate was degreased and rinsed under the conditions shown in Table 22. Then, a blocking type electrophotographic photosensitive member having the layer structure shown in FIG. 6A was produced by the deposited film forming apparatus shown in FIG. 3 using the above substrate under the conditions shown in Table 23. In this example, the Al—Si—O film had a composition ratio of 1:0.25:3 and a thickness of 75 Å.

The electrophotographic characteristics of the thus-obtained electrophotographic photosensitive member were evaluated by the following method. In evaluation, 10 photosensitive members were produced under the same conditions, and evaluated.

TABLE 22

| Processing conditions | Degreasing step | Rinsing step 1 | Rinsing step 2 | Drying step |
|---|---|---|---|---|
| Processing agent contained in water | Nonionic surfactant | Pure water (10 MΩ-cm) | Aqueous carbon dioxide solution (20 μS/cm) | Pure water (10 MΩ-cm) |
| Temperature | 40° C. | 40° C. | 40° C. | 40° C. |
| Processing time | 5 minutes | 50 seconds | 1 minute | 1 minute |
| pH | 10.3 | 7.0 | 4.5 | 7.0 |
| Inhibitor | Potassium silicate (3 g/l) | — | | |
| Others | Ultrasonic washing | | | |
| Rinsing Conditions | — | Pressure: 30 kgf/cm$^2$<br>Spray angle: 72°<br>Number of nozzles: 6<br>Direction of nozzle: +50°<br>Number of ring stages: 2 | — | — |

TABLE 23

| | Blocking layer for charge injection | Photo-conductive layer | Surface layer |
|---|---|---|---|
| Type of gas and flow rate: | | | |
| $SiH_4$ (sccm) | 200 | 400→430→430 | 186→169→30→25 |
| $H_2$ (sccm) | 400 | 800→1250→1250 | |
| $B_2H_6$ (sccm) (for SiH4) | 1500 | 1.25 | |
| NO (sccm) | 6.5 | | |
| $CH_4$ (sccm) | — | | 751→848→1448→1527 |
| Internal pressure (mTorr) | 285 | 285→550→550 | |
| Power (W) | 160 | 320→700→700 | |
| Time (min) | 34 | Initial 10 + 350 | |

The appearance of the thus-produced electrophotographic photosensitive member was evaluated by visually observing film peeling. Then, in experiment, the electrophotographic photosensitive member was subjected to corona charge by applying a voltage of 6 to 7 kV to a charger while the process speed was changed to any desired value in the range of 200 to 800 mm/sec, and a latent image was formed on the surface of the electrophotographic photosensitive member by laser image exposure at 788 nm. The photosensitive member was set in Canon Copying Machine NP6650, which was modified so that an image can be formed on transfer paper by a normal copying process, to evaluate image quality. The results of evaluation are shown in table 24.

The images were evaluated by the following method. As Comparative Example 1, a substrate was processed by the same method as Conventional Example 1, and a blocking electrophotographic photosensitive member equivalent to Example 14 was produced, and evaluated by the same method as Example 14. The results are also shown in Table 24.

Evaluation of Black Stain

The process speed was changed so that the average density of images obtained by copying a whole halftone original placed on the original base was 0.4±0.1. From the thus-obtained image samples, an image sample having the most significant stain was selected and evaluated. Evaluation was made by visually observing at a distance of 40 cm to examine whether a black stain was present according to the following criteria.

@. . . No black stain was observed on all copies.

○. . . Slight black stains were observed on some of the copies, but they caused no problem.

Δ. . . Black stains were observed on all copies, but they were slight and caused no practical problem.

x . . . Significant black stains were observed on all copies.

Evaluation of Electrophotographic Characteristic 1

The relative value of the surface potential of the photosensitive member, which was obtained at a development position when the same charge voltage was applied at a normal process speed, was evaluated as chargeability. However, the chargeability of the electrophotographic photosensitive member obtained in Conventional Example 1 was considered as 100%.

Evaluation of Electrophotographic Characteristic 2

After the same charge voltage was applied at a normal process speed, light is applied to evaluate, as sensitivity, the relative value of the quantity of light obtained when the voltage is decreased to a predetermined value. However, the sensitivity of the electrophotographic photosensitive member obtained in Conventional Example 1 was considered as 100%.

Evaluation of Cost

@. . . Low-cost production is possible.

○. . . Cost is equivalent to a conventional example.

x . . . The cost is increased.

TABLE 24

| | Image defect | Black stain | Electro-photographic characteristic 1 | Electro-photographic characteristic 2 | Cost |
|---|---|---|---|---|---|
| Example 14 | * | * | 130% | 120% | ⊚ |
| Comparative example 1 | o | o | 100% | 100% | ○ |

Table 24 shows good results, and the unexpected effect of improving electrophotographic photosensitive characteristics could be obtained.

EXAMPLE 15

A blocking type electrophotographic photosensitive member was produced by the same method as Example 14 using the same substrate as Example 14, and evaluated by the method described below. The results are shown in Table 25. As Comparative Example 2, a substrate was processed by the same method as Conventional Example 1, and then a blocking type electrophotographic photosensitive member was produced and evaluated by the same method as Example 1. The results are also shown in Table 25.

TABLE 25

| | Sliding property | Nonuniformity in image | Fogging on white ground |
|---|---|---|---|
| Example 15 | 128% | ⊚ | ⊚ |
| Comparative example 2 (Conventional Example 1) | 100% | ○○ | ○ |

Nonuniformity in Image

The evaluation method was the same as Example 1.

Evaluation of Sliding Property

A load was applied to a blade to detect the force (fractional force) of a drum to attract the blade by using a piezo element before and after the start of rotation of the drum. The maximum static friction coefficient and dynamic fraction coefficient were calculated from the load and the maximum static frictional force immediately before the start of rotation, and dynamic friction force during stationary rotation, respectively. The relative values of these coefficients relative to 100% of Conventional Example 1 were compared. The lower the relative value, the better the sliding property.

<Evaluation of fogging on white ground>

The image samples obtained by copying a whole character original with a white ground placed on the original base were observed to evaluate fogging in a white portion.

@. . . Good

○. . . Slight fogging was partially observed.

Δ. . . Fogging was observed over the whole area, but caused no problem in recognizing characters.

x . . . Fogging occurred to cause difficulties in reading characters in a portion.

Table 25 shows good results.

EXAMPLE 16

Figure 4A:
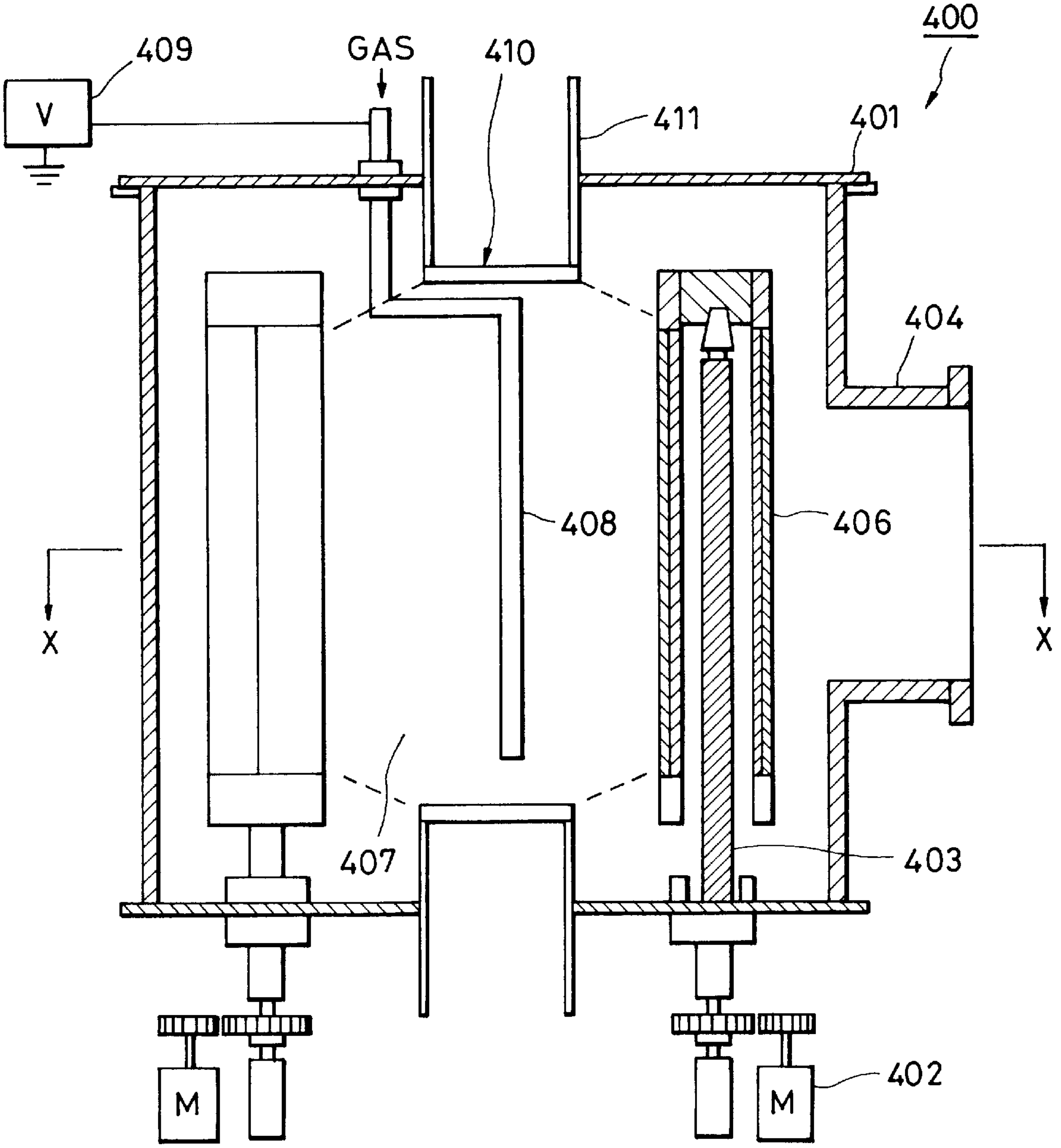
FIG. 4A is a schematic longitudinal sectional view of a deposited film forming apparatus for forming a deposited film on a cylindrical substrate by a microwave plasma CVD method.
Figure 4B:
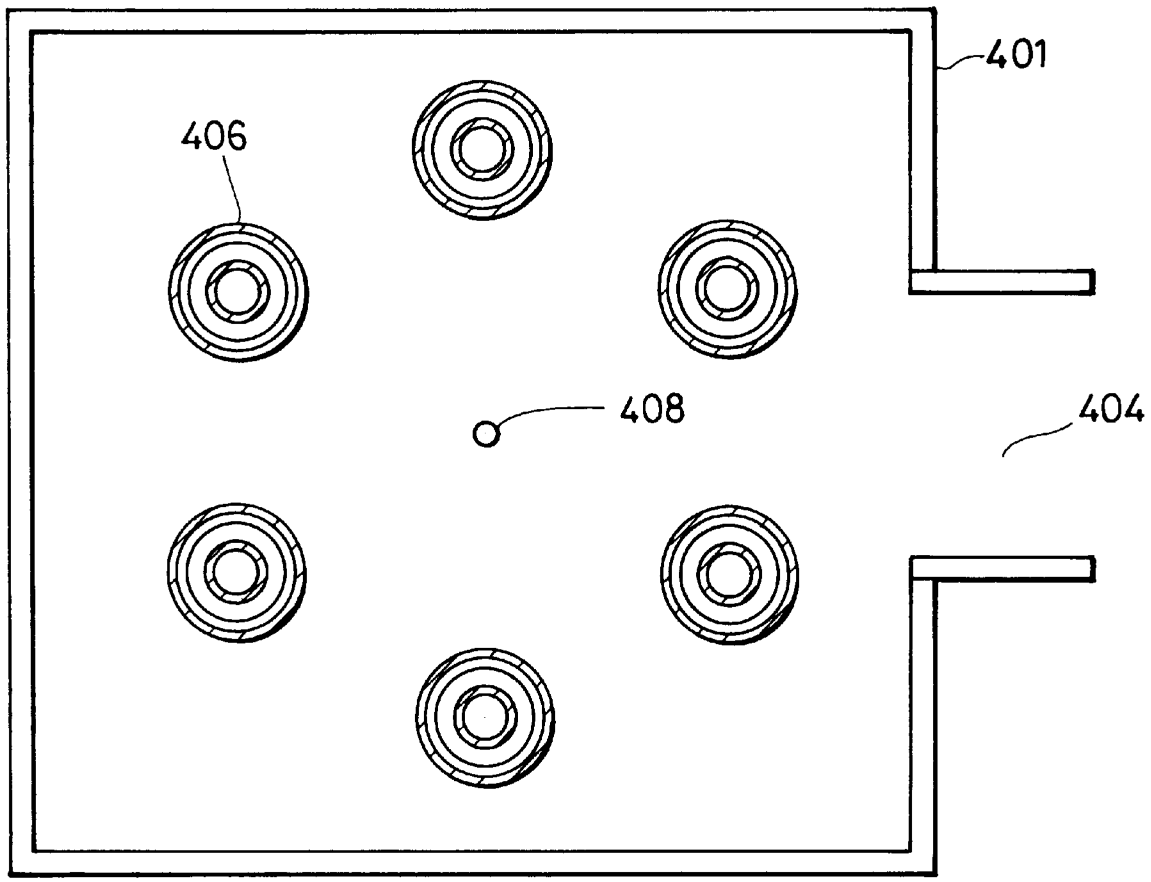
FIG. 4B is a sectional view taken along line X—X in FIG. 4A.
Figure 5:
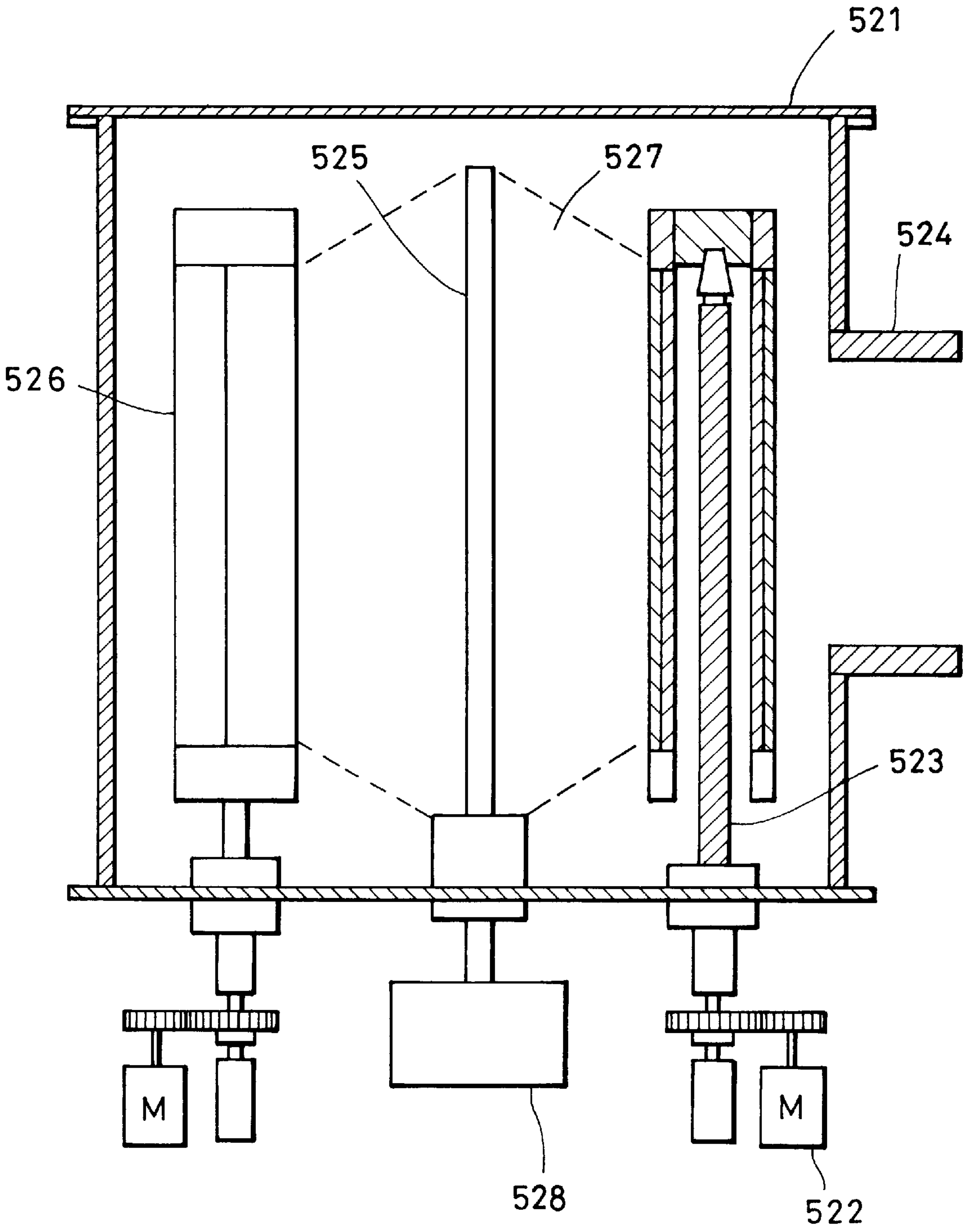
FIG. 5 is a schematic longitudinal sectional view of a deposited film forming apparatus for forming a deposited film on a cylindrical substrate by a VHF plasma CVD method.
Figure 6B:
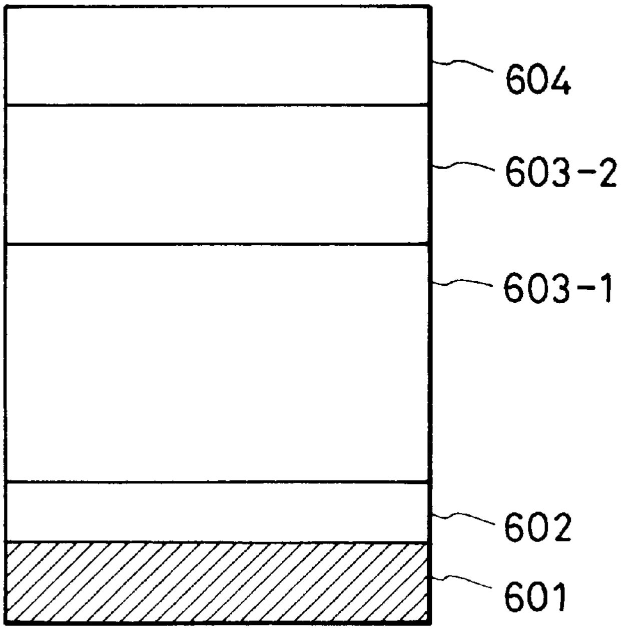

The surface of the same substrate as Example 14 was processed by the same method as Example 14, and then a blocking type electrophotographic photosensitive member having the structure shown in FIG. 6B was produced by using the microwave CVD apparatus ($\mu$wPCVD apparatus) shown in FIGS. 4A and 4B under the conditions shown in Table 26, and evaluated by the same method as Example 14. The results are shown in Table 27. As Comparative Example 3, a substrate was processed by the same method as Conventional Example 1, and then a blocking type electrophotographic photosensitive member was produced and evaluated by the same method. The results are also shown in Table 27. And FIG. 4 shows microwave CVD apparatus 400 of the present invention. Reference numerals 401, 402, 403, 404, 406, 407, 408, 409, 410 and 411 denote a chamber, a motor, a heater, an exhaust tube, a substrate, a space for discharging, an electrode, a direct current resource, a microwave loading window, and a wave loading tube, respectively. The chamber 401 is able to set the substrate inside. The motor 402 is able to have the substrate 406 rotate at the time of forming layer on the surface of the substrate 406. The heater 403 is able to heat the substrate 406 at the time of forming a layer on the surface of the substrate 406. The exhaust tube 404 is the tube to exhaust from the chamber 401. The space for discharging 407 is the space between the substrate 406 and the electrode 408. The direction current resource 408 supplies direct current to the electrode 408. And the electrode 408 has a function to load the gas into the chamber 401 too. The microwave travels in the wave loading tube 411 and goes through the microwave loading window 410 and comes into the chamber 401. The FIG. 5 is a sectional view taken along line X—X in FIG. 4A. In FIG. 6B, reference numerals 601, 602, 603-1, 603-2, and 604 denote an aluminum substrate, a blocking layer for charge injection, a charge transfer layer, a charge generation layer, and a surface layer, respectively.

TABLE 26

| | Blocking layer for charge injection | Photo-conductive layer | Charge generation layer | Surface layer |
|---|---|---|---|---|
| Flow rates of raw material gas: | | | | |
| $SiH_4$ (sccm) | 360 | 360 | 360 | 70 |
| He (sccm) | 100 | 100 | 100 | 100 |
| $CH_4$ (sccm) | 40 | 40 | 40 | 350 |
| $B_2H_6$ (ppm) | 1000 | 0 | 0 | 0 |
| Pressure (mTorr) | 11 | 11 | 10 | 12 |
| Microwave (W) | 1000 | 1000 | 1000 | 1000 |
| Bias voltage (V) | 100 | 100 | 100 | 100 |
| Layer thickness ($\mu$) | 3 | 20 | 5 | 0.5 |

TABLE 27

| | Image defect | Black stain | Electro-photographic characteristic 1 | Electro-photographic characteristic 2 | Cost |
|---|---|---|---|---|---|
| Example 16 | * | * | 133% | 125% | * |
| Comparative example 3 (Conventional Example 1) | o | o | 100% | 100% | o |

Table 27 indicates that the present invention is effective even if the apparatus and the layer structure are changed.

EXAMPLE 17

The surface of the same substrate as Example 14 was processed by the same method as Example 14, and then a blocking type electrophotographic photosensitive member having the structure shown in FIG. 6B was produced by using the VHF PCVD apparatus shown in FIGS. 5 under the conditions shown in Table 28, and evaluated by the same method as Example 14. As a result, like in Example 14, good results were obtained.

TABLE 28

| | Blocking layer for charge injection | Photo-conductive layer | Surface layer |
|---|---|---|---|
| Flow rates of raw gases: | | | |
| $SiH_4$ (sccm) | 200 | 200→240 | 200→10→10 |
| $H_2$ (sccm) | 660 | 660→960 | |
| $CH_4$ (sccm) | 1500 | 3 | |
| $B_2H_6$ (sccm) (for $SiH_4$) | | | |
| NO (sccm) | 10 | | |
| $CH_4$ (sccm) | | | 0→500→500 |
| $SiF_4$ (sccm) | | | 10→0 |

TABLE 28-continued

| | Blocking layer for charge injection | Photo-conductive layer | Surface layer |
|---|---|---|---|
| Internal pressure (mTorr) | 30 | 30→10 | 300→450 |
| Power (W) | 200 | 200→800 | 250 |
| Thickness ($\mu$) | 2.5 | 28 | 0.5 |

As described above, the present invention can form a deposited film of high quality on a substrate by the washing method comprising spraying water on the substrate surface from at least two nozzle groups having a twisted positional relationship therebetween. In accordance with the present invention, in a method of producing an electrophotographic photosensitive member comprising a functional film on a substrate, before the step of forming the functional film, the surface of the substrate is washed with high-pressure water under a pressure of 5 to 50 kgf/cm$^2$ by using a first nozzle group provided on a ring and a second nozzle group provided on another ring adjacent to the first nozzle group in a twisted positional relationship therebetween. The substrate surface is washed with any one of pure water, water in which carbon dioxide is dissolved, and water containing a specified inhibitor, or a combination of at least two types by using the first and second nozzle groups to permit production of an electrophotographic photosensitive member, which can form high-quality uniform images, at low cost and in high yield.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of producing an electrophotographic photosensitive member comprising the steps of:

forming a functional film composed of an amorphous material containing a silicon atom as a major component on a surface of an aluminum substrate by a vacuum vapor phase growth method; and spraying water on said surface of said substrate from nozzles before said functional film is formed on said surface;

wherein the nozzles for spraying water on the substrate surface comprise first and second nozzle groups each of which comprise at least two nozzles arranged at equal intervals wherein said first and second nozzle groups are each concentrically arranged on a separate circle, and wherein the nozzle groups have a twisted positional relationship between them, and wherein said twisted positional relationship is that said nozzles of said second nozzle group are differently positioned from said nozzles of said first nozzle group in an axial direction with respect to a circle face of a cylindrical substrate.

2. A method of producing an electrophotographic photosensitive member according to claim 1, wherein an angle of the nozzles is set from more than 0° to 60° or less to the direction of the substrate length when a direction perpendicular to said substrate is 0°.

3. A method of producing an electrophotographic photosensitive member according to claim 1, wherein said water is sprayed from said nozzles at a spray angle of ±60° in the direction of the substrate length.

4. A method of producing an electrophotographic photosensitive member according to claim 1, wherein said water is sprayed with a pressure in the range of 5 to 50 $kgf/cm^2$.

5. A method of producing an electrophotographic photosensitive member according to claim 1, further comprising a step of degreasing and washing of said substrate surface, a step of rinsing said substrate, and a step of drying said substrate before said functional film is formed on said substrate.

6. A method of producing an electrophotographic photosensitive member according to claim 5, wherein in said rinsing step, said water is sprayed on said substrate surface from said first and second nozzle groups.

7. A method of producing an electrophotographic photosensitive member according to claim 6, wherein an inhibitor for forming a film on said substrate is dissolved in at least one of water containing a surfactant used in said degreasing and washing step, and the water used in said rinsing step.

8. A method of producing an electrophotographic photosensitive member according to claim 7, wherein said inhibitor comprises a silicate.

9. A method of producing an electrophotographic photosensitive member according to claim 8, wherein said silicate is potassium silicate.

10. A method of producing an electrophotographic photosensitive member according to claim 5, wherein carbon dioxide is dissolved in at least one of said water, and water used in said step of drying said substrate.

11. A method of producing an electrophotographic photosensitive member according to claim 5, wherein said water used in said drying step is hot water.

12. A method of producing an electrophotographic photosensitive member according to claim 11, wherein said drying step comprises pulling up said substrate from said hot water used in said drying step.

13. A method of producing an electrophotographic photosensitive member according to claim 7, wherein the concentration of said inhibitor contained in said water is in the range of $10^{\circ}$ to $10^{-6}$ mol/l.

14. A method of producing an electrophotographic photosensitive member according to claim 7, wherein said film formed on said substrate surface by using said inhibitor and composed of aluminum, silicon and oxygen has a thickness of 5 angstroms to 150 angstroms, and the following composition ratio:

when aluminum:silicon:oxygen=a:b:c, and a=1, b and c are in the following ranges:

$0.1 \leqq b \leqq 1.0$ $1 \leqq c \leqq 5$.

15. A method of producing an electrophotographic photosensitive member according to claim 1, wherein said step of forming said functional film on said aluminum substrate comprises forming an amorphous deposited film composed of at least one of a hydrogen atom and a fluorine atom, and a silicon atom on said aluminum substrate by a plasma CVD method.

16. A method of producing an electrophotographic photosensitive member according to claim 1, wherein said aluminum substrate contains 10 ppm to 1 wt % of Fe.

17. A method of producing an electrophotographic photosensitive member according to claim 1, wherein said aluminum substrate contains 10 ppm to 1 wt % of Si.

18. A method of producing an electrophotographic photosensitive member according to claim 1, wherein said aluminum substrate contains 10 ppm to 1 wt % of Cu.

19. A method of producing an electrophotographic photosensitive member according to claim 1, wherein said aluminum substrate contains Fe, Si and Cu at a total content of 0.01 wt % to 1 wt %.

20. An apparatus for producing an electrophotographic photosensitive member comprising:

a plurality of nozzles for spraying water on a surface of a substrate;

wherein said nozzles for spraying water on said substrate surface comprise first and second nozzle groups each of which comprise at least two nozzles arranged at equal intervals wherein said first and second nozzle groups are each concentrically arranged on a separate circle, and wherein the nozzle groups have a twisted positional relationship between them, and wherein said twisted positional relationship is that said nozzles of said second nozzle group are differently positioned from said nozzles of said first nozzle group in an axial direction with respect to a circle face of a cylindrical substrate.

21. An apparatus for producing an electrophotographic photosensitive member according to claim 20, wherein an angle of the nozzles is set from more than 0° to 60° or less to the direction of the substrate length when a direction Perpendicular to said substrate is 0°.

22. An apparatus for producing an electrophotographic photosensitive member according to claim 20, wherein said water is sprayed from said nozzles at a spray angle of ±60° in a direction of said substrate length.

* * * * *

UNITED STATES PATENT AND TRADEMARK OFFICE
CERTIFICATE OF CORRECTION

PATENT NO. : 6,103,442
DATED : August 15, 2000
INVENTOR(S) : Hiroyuki Katagiri et al.

It is certified that error appears in the above-identified patent and that said Letters Patent is hereby corrected as shown below:

Column 2,
Line 42, "go" should be deleted.

Column 6,
Line 4, "is" should read -- are --.

Column 10,
Line 36, "the." should read -- the --.

Column 11,
Line 66, "As" should read -- As for --.

Column 12,
Line 55, "vapoorisingpresent invention" should read -- vaporizing --; and
Line 63, "vapoorizing" should read -- vaporizing --.

Column 13,
Line 57, "($N_2O$" should read -- ($N_2O$), --;
Line 58, ")," should be deleted;
Line 59, "($CII_4$)," should read -- ($CH_4$), --

Column 15,
Line 28, "!5" should read -- 15 --.

Column 16,
Line 10, "@" should read --◎--; and
Line 24, "@" should read --◎--.

UNITED STATES PATENT AND TRADEMARK OFFICE
CERTIFICATE OF CORRECTION

PATENT NO. : 6,103,442
DATED : August 15, 2000
INVENTOR(S) : Hiroyuki Katagiri et al.

It is certified that error appears in the above-identified patent and that said Letters Patent is hereby corrected as shown below:

Column 18,
Table 7, Table 7 should read

--

Table 7

| | Degreasing and washing step | Rinsing step | Drying step | Results of overall evaluation of black stain and image defect | Environmental properties |
|---|---|---|---|---|---|
| Potassium silicate | * | — | — | o | o |
| | — | * | — | o | o |
| | — | — | * | x | o |
| | * | * | — | o | o |
| | * | — | * | o | o |
| | — | * | * | o | o |
| | * | * | * | o | o |
| Comparative | — | — | — | x | o |

--.

Column 19,
Line 24, "@" should read --◎--.

Column 20,
Line 21, "show" should read -- shown --.

Column 22,
Line 10, "@" should read --◎-- and "without no stain" should read -- without stains --;
Line 11, insert -- o small stains with no problem --; and
Line 31, "concentrations" should read -- concentration --.

UNITED STATES PATENT AND TRADEMARK OFFICE

CERTIFICATE OF CORRECTION

PATENT NO. : 6,103,442
DATED : August 15, 2000
INVENTOR(S) : Hiroyuki Katagiri et al.

It is certified that error appears in the above-identified patent and that said Letters Patent is hereby corrected as shown below:

Column 27,
Line 14, "@" should read --◎--;

Line 39, "@" should read --◎--; and

Table 24, Table 24 should read

-- Table 24

| | Image defect | Black stain | Electro-photographic characteristic 1 | Electro-photographic characteristic 2 | Cost |
|---|---|---|---|---|---|
| Example 14 | ◎ | ◎ | 130% | 120% | ◎ |
| Comparative example 1 | ○ | ○ | 100% | 100% | ○ |

--.

Column 28,
Table 25, Table 25 should read

-- Table 25

| | Sliding property | Nonuniformity in image | Fogging on white ground |
|---|---|---|---|
| Example 15 | 128% | ◎ | ◎ |
| Comparative example 2 (Conventional Example 1) | 100% | ○ | ○ |

--;

and

Line 29, "@" should read --◎--.

UNITED STATES PATENT AND TRADEMARK OFFICE
CERTIFICATE OF CORRECTION

PATENT NO. : 6,103,442
DATED : August 15, 2000
INVENTOR(S) : Hiroyuki Katagiri et al.

It is certified that error appears in the above-identified patent and that said Letters Patent is hereby corrected as shown below:

Column 29,
Table 27, Table 27 should read

Table 27

--

| | Image defect | Black stain | Electrophotographic characteristic 1 | Electrophotographic characteristic 2 | Cost |
|---|---|---|---|---|---|
| Example 16 | ◎ | ◎ | 133% | 125% | ◎ |
| Comparative example 3 (Conventional Example 1) | ○ | ○ | 100% | 100% | ○ |

--;

and
Line 47, "FIGS. 5" should read -- FIG. 5 --.

Column 32,
Line 45, "Perpendicular" should read -- perpendicular --.

Signed and Sealed this

Ninth Day of April, 2002

*Attest:*

JAMES E. ROGAN
*Director of the United States Patent and Trademark Office*

*Attesting Officer*